(12) United States Patent
Yamamoto et al.

(10) Patent No.: US 7,405,846 B2
(45) Date of Patent: Jul. 29, 2008

(54) FACSIMILE APPARATUS AND DATA ENTRY METHOD THEREOF

(75) Inventors: Yasushi Yamamoto, Yamatokoriyama (JP); Hiroaki Nakamura, Yamatokoriyama (JP); Hirotoshi Ohkubo, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1033 days.

(21) Appl. No.: 10/811,842

(22) Filed: Mar. 30, 2004

(65) Prior Publication Data

US 2004/0190077 A1  Sep. 30, 2004

(30) Foreign Application Priority Data

Mar. 31, 2003  (JP) .............................. 2003-096496
Jun. 25, 2003  (JP) .............................. 2003-181527

(51) Int. Cl.
*H04N 1/40* (2006.01)
*H04N 1/00* (2006.01)

(52) U.S. Cl. .................. 358/440; 358/404; 358/444

(58) Field of Classification Search ................ 358/1.16, 358/1.17, 440, 523, 400, 404, 444
See application file for complete search history.

(56) References Cited

U.S. PATENT DOCUMENTS

| | | | |
|---|---|---|---|
| 5,799,070 A * | 8/1998 | Monty et al. ........... 379/100.14 |
| 5,930,350 A * | 7/1999 | Johnson .................. 379/355.06 |
| 6,195,428 B1 * | 2/2001 | Maruyama ............. 379/355.09 |
| 6,961,147 B2 * | 11/2005 | Ishiyama ..................... 358/1.9 |
| 6,975,854 B1 * | 12/2005 | Kee .......................... 455/414.1 |
| 7,103,388 B2 * | 9/2006 | Scott ........................... 455/566 |
| 2002/0135813 A1 * | 9/2002 | Tanimoto .................... 358/402 |
| 2004/0019649 A1 * | 1/2004 | Tanimoto .................... 709/206 |
| 2004/0224717 A1 * | 11/2004 | Hertzberg et al. ........ 455/550.1 |
| 2005/0130642 A1 * | 6/2005 | Scott .......................... 455/418 |

FOREIGN PATENT DOCUMENTS

JP  9-181848 A  7/1997
JP  2001-326796 A  11/2001

* cited by examiner

*Primary Examiner*—Jerome Grant, II
(74) *Attorney, Agent, or Firm*—Birch, Stewart, Kolasch & Birch, LLP

(57) ABSTRACT

In the transfer and entry of one-touch dial data or speed dial data from a facsimile apparatus 1 to a facsimile apparatus 10, the respective sizes of one-touch dial memory and speed dial memory in the facsimile apparatus 10 are detected. The one-touch dial data are transferred and entered in the facsimile apparatus 10 (P1). The speed dial data are transferred and entered in the facsimile apparatus 10 (P2). Any remaining speed dial data are entered in the one-touch memory (P3). This reduces or eliminates overflow of the one-touch dial data or speed dial data.

20 Claims, 19 Drawing Sheets

FIG. 3

| TYPE | SPEED DIAL | ONE-TOUCH DIAL |
|---|---|---|
| ONE-TOUCH (SPEED) DIAL NUMBER | 123 | A |
| DESTINATION NAME | X | Y |
| DESTINATION NAME IN KANA | COMPANY X | COMPANY Y |
| PHONE (FAX) NUMBER | 0123-45-XXXX | 098-765-YYYY |
| ATTRIBUTE OF COMMUNICATIONS | COMMUNICATION SPEED 28800bps | COMMUNICATION SPEED 28800bps |

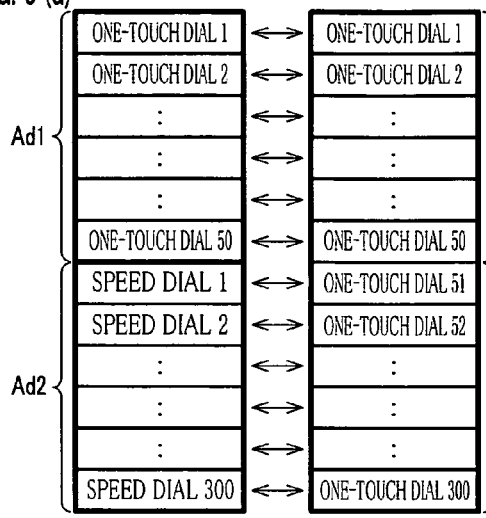
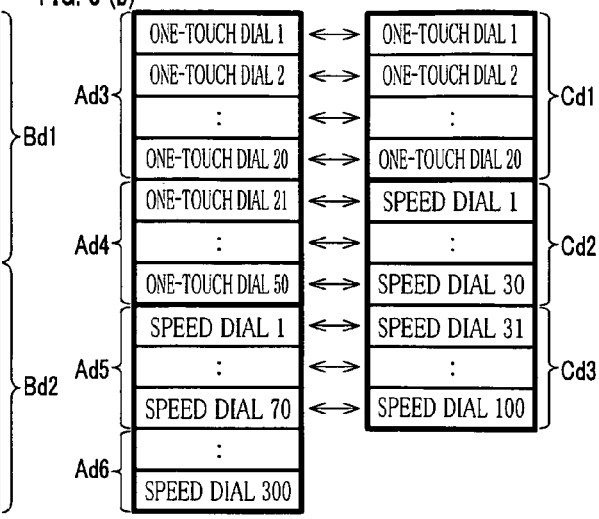
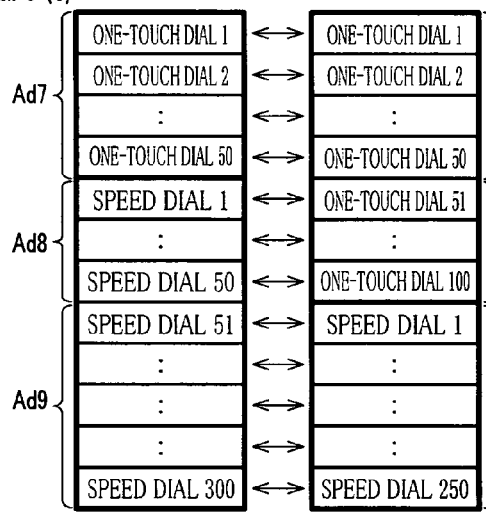
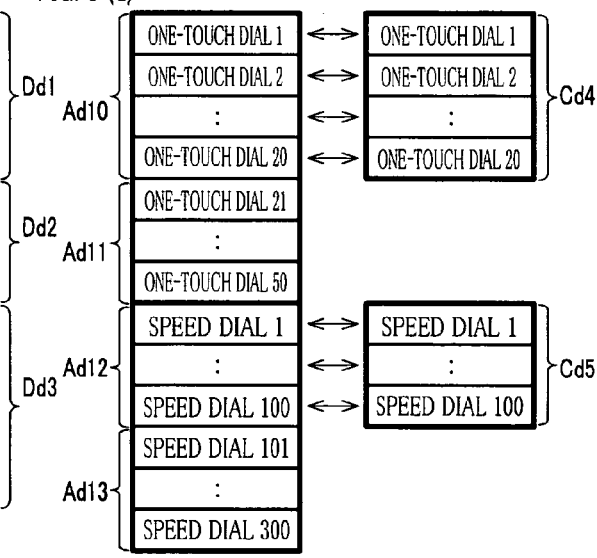
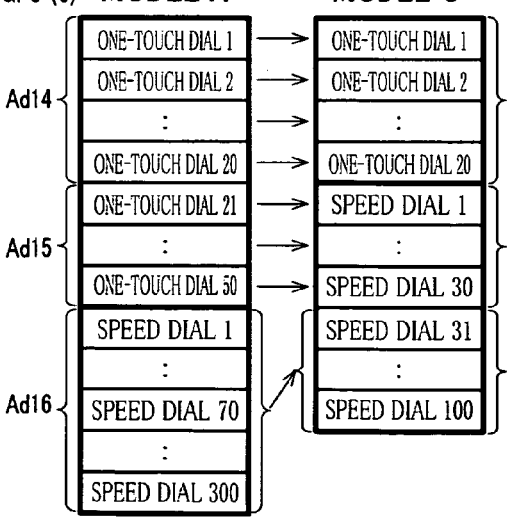
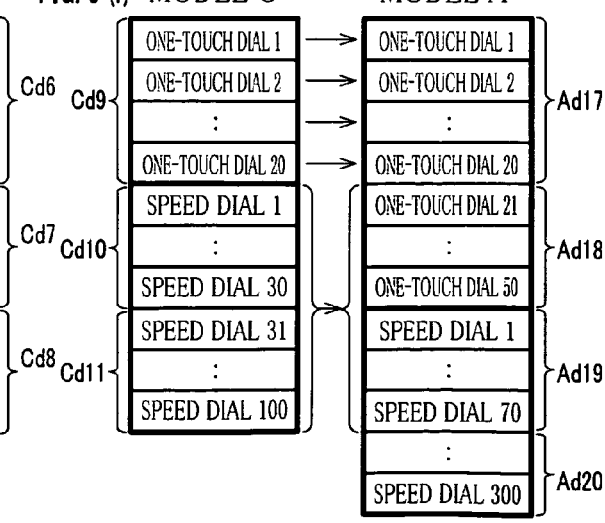

FIG. 10 (a)

DATA STRUCTURE    DATA SAMPLE

| TYPE | SPEED DIAL | ONE-TOUCH DIAL |
|---|---|---|
| ONE-TOUCH (SPEED) DIAL NUMBER | 123 | A |
| DESTINATION NAME | X | Y |
| DESTINATION NAME IN KANA | COMPANY X | COMPANY Y |
| PHONE (FAX) NUMBER | 0123-45-XXXX | 098-765-YYYY |
| ATTRIBUTE OF COMMUNICATIONS | COMMUNICATION SPEED 28800bps | COMMUNICATION SPEED 28800bps |
| FREQUENCY INFORMATION | 100 | 200 |

FIG. 10 (b)
UPDATE FREQUENCY INFORMATION

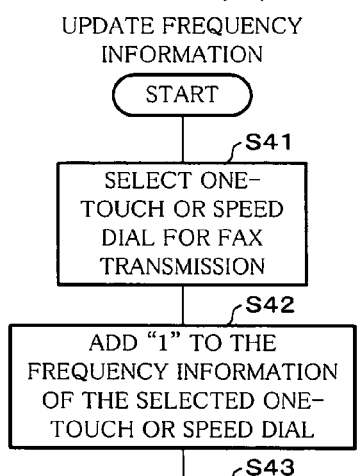

FIG. 10 (c)
INITIALIZE FREQUENCY INFORMATION

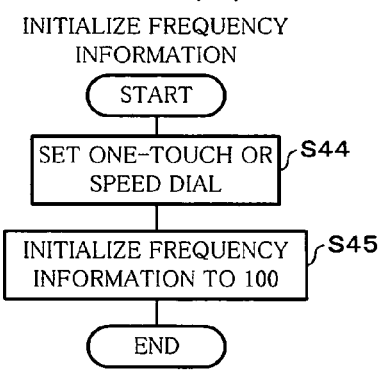

FIG. 10 (d)
UPDATE UNUSED FREQUENCY INFORMATION

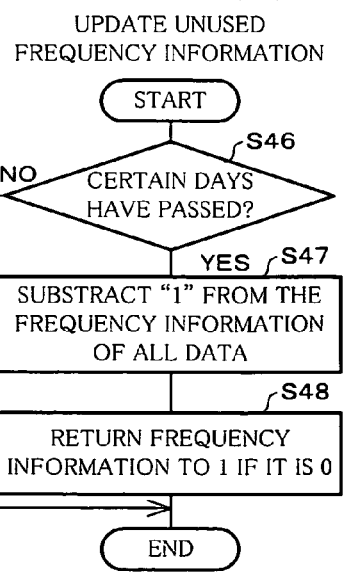

FIG. 10 (e)
DATA EXCANHGE WITH FREQUENCY INFORMATION

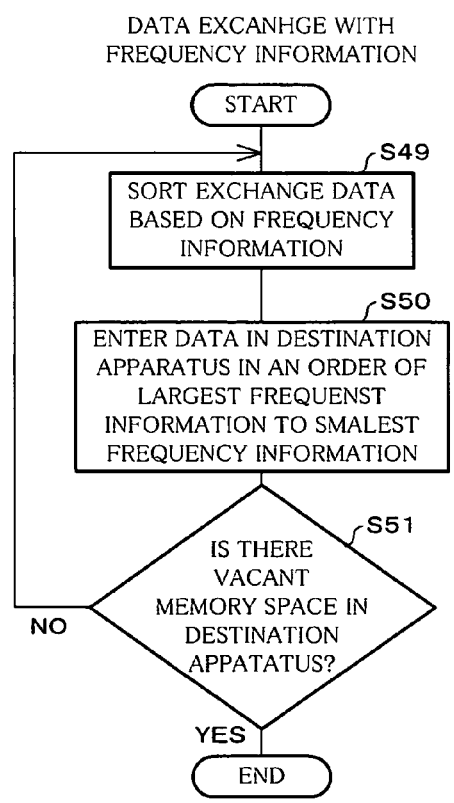

FIG. 16 (a)

| GROUP 1 | ONE-TOUCH DIAL 1 | ONE-TOUCH DIAL 20 | SPEED DIAL 1 | AAA-3333 |
|---|---|---|---|---|
| GROUP 2 | ONE-TOUCH DIAL 2 | ONE-TOUCH DIAL 35 | SPEED DIAL 19 | BBB-4321 |

FIG. 16 (b)

| | | |
|---|---|---|
| ONE-TOUCH DIAL 1 | XXX-0101 | ⎫ |
| ONE-TOUCH DIAL 2 | XXX-0202 | ⎬ Ed1 |
| ... | ... | |
| ONE-TOUCH DIAL 10 | XXX-1010 | ⎭ |
| ONE-TOUCH DIAL 11 | XXX-1111 | ⎫ |
| ... | ... | ⎬ Ed2 |
| ONE-TOUCH DIAL 20 | XXX-2020 | ⎭ |
| ... | ... | ⎫ Ed3 |
| ONE-TOUCH DIAL 35 | XXX-3535 | ⎭ |

FIG. 16 (c)

| | | |
|---|---|---|
| SPEED DIAL 1 | YYY-1111 | ⎫ |
| SPEED DIAL 2 | YYY-2222 | ⎬ Ed4 |
| ... | ... | |
| SPEED DIAL 15 | YYY-1515 | ⎭ |
| SPEED DIAL 16 | YYY-1616 | ⎫ |
| ... | ... | ⎬ Ed5 |
| SPEED DIAL 19 | YYY-1919 | |
| SPEED DIAL 20 | YYY-2020 | ⎭ |

FIG. 17 (a)

| GROUP 1 | ONE-TOUCH DIAL 1 | SPEED DIAL 30 | SPEED DIAL 1 | AAA-3333 |
|---|---|---|---|---|
| GROUP 2 | ONE-TOUCH DIAL 2 | XXX-3535 | SPEED DIAL 19 | BBB-4321 |

FIG. 17 (b)

| | | |
|---|---|---|
| ONE-TOUCH DIAL 1 | XXX-0101 | ⎫ |
| ONE-TOUCH DIAL 2 | XXX-0202 | ⎬ Fd1 |
| ... | ... | |
| ONE-TOUCH DIAL 10 | XXX-1010 | ⎭ |

FIG. 17 (c)

| | | |
|---|---|---|
| SPEED DIAL 1 | YYY-1111 | ⎫ |
| SPEED DIAL 2 | YYY-2222 | |
| ... | ... | Fd2 |
| SPEED DIAL 19 | YYY-1919 | |
| SPEED DIAL 20 | YYY-2020 | ⎭ |
| SPEED DIAL 21 | XXX-1111 | ⎫ |
| ... | ... | Fd3 |
| SPEED DIAL 30 | XXX-2020 | ⎭ |

FIG. 18 (a)

| GROUP 1 | ONE-TOUCH DIAL 1 | ONE-TOUCH DIAL 20 | ONE-TOUCH DIAL 36 | AAA-3333 |
|---|---|---|---|---|
| GROUP 2 | ONE-TOUCH DIAL 2 | ONE-TOUCH DIAL 35 | YYY-1919 | BBB-4321 |

FIG. 18 (b)

| | | |
|---|---|---|
| ONE-TOUCH DIAL 1 | XXX-0101 | ⎫ |
| ONE-TOUCH DIAL 2 | XXX-0202 | ⎬ Gd1 |
| ... | ... | |
| ONE-TOUCH DIAL 35 | XXX-3535 | ⎭ |
| ONE-TOUCH DIAL 36 | YYY-1111 | ⎫ |
| ONE-TOUCH DIAL 37 | YYY-2222 | ⎬ Gd2 |
| ... | ... | |
| ONE-TOUCH DIAL 50 | YYY-1515 | ⎭ |

FACSIMILE APPARATUS AND DATA ENTRY METHOD THEREOF

This Nonprovisional application claims priority under 35 U.S.C. § 119(a) on patent application Ser. No. 2003/096496 filed in Japan on Mar. 31, 2003, and No. 2003-181527 filed in Japan on Jun. 25, 2003, the entire contents of which are hereby incorporated by reference.

FIELD OF THE INVENTION

The present invention relates to facsimile apparatuses and data entry method thereof.

BACKGROUND OF THE INVENTION

Some facsimile apparatuses are equipped with speed dial and one-touch dial functions to provide a short cut for selecting destinations.

Speed dials enable facsimile transmission to a specific destination by allowing a user to enter a combination of usually two to three numbers through the numeric keys (ten-keys) of the facsimile apparatus. The combination of numbers used in speed dialing is generally shorter than the phone number (FAX number) of a destination facsimile apparatus, making speed dialing an efficient way of making facsimile transmission. For example, by assigning speed dial numbers to frequently called destinations, the operability and efficiency of facsimile transmission can be greatly improved.

One-touch dials enable facsimile transmission to a specific destination with the use of designated keys that are independently provided from the numeric keys. One-touch dialing uses only a single key to make transmission, and therefore is more convenient than speed dialing. For example, by assigning one-touch dial numbers to most frequently called destinations, faxes can be sent even more easily and efficiently.

A facsimile apparatus with speed dial and one-touch dial functions is disclosed in, for example, Japanese Publication for Unexamined Patent Application No. 181848/1997 (*Toku-kaihei* 9-181848, published on Jul. 11, 1997). The facsimile apparatus disclosed in this publication has a data backup system that enables the data of assigned speed dial numbers and one-touch dial numbers to be restored even when they are erased. More specifically, the facsimile apparatus can re-enter the lost data of speed dial numbers and one-touch dial numbers by obtaining the data from a different apparatus.

Other facsimile apparatuses are equipped with a multicast function that enables data to be sent to multiple destinations. The multicast function sends faxes to specific multiple destinations by group dialing in which a group dial number is entered using, for example, numeric keys, designated keys (independently provided from the numeric keys), and combinations of numeric keys and designated keys.

In group dialing, the multicast destinations may be assigned by speed dial numbers or one-touch dial numbers, for example. Alternatively, FAX numbers may be assigned to group dial numbers (number entry).

That is, in group dialing, the data of group dial numbers may be entered by a combination of one-touch dial numbers, speed dial numbers, and FAX numbers.

A problem of these conventional apparatuses is that some of the speed dial numbers and one-touch dial numbers may be left out when they are transferred from one facsimile apparatus to another.

Specifically, facsimile apparatuses produced by different manufacturers have different memory sizes for storing data of speed dial numbers and one-touch dial numbers. That is, the number of destinations (the number of maximum entries) for the speed dial numbers or one-touch dial numbers may not be the same between the facsimile apparatuses of different manufacturers, or the facsimile apparatuses of different models.

For example, the number of maximum entries for the speed dial numbers and the number of maximum entries for the one-touch dial numbers may be different from those in a newly purchased facsimile apparatus of a different model. In this case, some of the speed dial numbers and one-touch dial numbers may be left out and the data may be lost when transferring the data of speed dial numbers and one-touch dial numbers to the new facsimile apparatus.

The problem is also caused when using group dial numbers in the facsimile apparatus. Namely, when group dial numbers are entered using a speed dial number or a one-touch dial number, one-touch dial numbers may not be entered properly when the data is lost. In this case, a user is forced to reset the data of group dial numbers.

SUMMARY OF THE INVENTION

A feature of the present invention is to provide a facsimile apparatus and a data transfer method thereof that can transfer data of one-touch dial numbers and speed dial numbers to a different facsimile apparatus without failing to enter the data, or by reducing the amount of unentered data.

In order to achieve this feature, a facsimile apparatus of the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; a second memory for storing data used by the speed dial section; a detecting section for finding a vacant memory space in a third memory and a fourth memory of another facsimile apparatus connected to the facsimile apparatus, the third memory storing data used by a one-touch dial section provided in the another facsimile apparatus, the fourth memory storing data used by a speed dial section provided in the another facsimile apparatus; and an entry section for entering data of the first memory in the third memory, and data of the second memory in the fourth memory, the entry section entering at least some of the data stored in the second memory in the third memory when the detecting section finds that an amount of data stored in the second memory exceeds a vacant memory space in the fourth memory, and that an amount of data stored in the first memory is smaller than a vacant memory space in the third memory.

With this configuration, when a combination of two or three numeric keys is selected for example, the speed dial section of the facsimile apparatus reads out assigned data of the selected numeric keys from the second memory, and sends the data to a destination apparatus assigned by the combination of numeric keys. The second memory stores data to be used by the speed dial section (speed dial data) in the destination apparatus. The function of the speed dial section may be realized by using a designated key and a combination of numeric keys.

When one of the keys independently provided from the numeric keys is selected, the one-touch dial section reads out assigned data of the selected key from the first memory, and sends the data to a destination apparatus assigned by the selected key. The first memory stores data to be used by the one-touch dial section (one-touch dial data) in the destination apparatus.

In order to enter the one-touch dial data or speed dial data in a different facsimile apparatus, the detecting section searches through the third memory of the destination apparatus to find a vacant memory space for storing the one-touch dial data. In a similar fashion, the detecting section also searches through the fourth memory to find a vacant memory space for storing the speed dial data.

The vacant memory space may be detected, for example, by finding the size of the memory space in bytes, or by finding the number of data that can be entered in the memory (maximum entries). The vacant memory space in the third memory and fourth memory does not necessarily mean a free memory space in which no data is contained, but it includes a memory space containing data that may be overwritten. The first memory and the second memory may be realized by non-volatile memory, for example.

By the entry section, the stored data in the first memory is entered in the vacant memory space of the third memory, and the stored data in the second memory is entered in the fourth memory.

If the size of stored data in the first memory exceeds the vacant memory space in the third memory for example, some of the one-touch dial data will not be entered in the destination apparatus, generating overflow one-touch dial data. Similarly, if the size of stored data in the second memory exceeds the vacant memory space in the fourth memory, some of the speed dial data will not be entered in the destination apparatus, generating overflow speed dial data.

In order to prevent this, the entry section enters at least some of the stored data of the second memory in the third memory when the size of stored data in the second memory exceeds the vacant memory space of the fourth memory and when the size of stored data in the first memory is smaller than the vacant memory space of the third memory.

For example, when some of the stored data in the second memory cannot be entered in the fourth memory, these data are entered in the vacant memory space of the third memory. In this way, overflow one-touch dial data can be reduced or eliminated.

The present invention therefore provides a facsimile apparatus that can minimize or eliminate overflow one-touch dial data or overflow speed dial data.

In order to achieve the foregoing feature, a facsimile apparatus of the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; a second memory for storing data used by the speed dial section; a detecting section for finding a vacant memory space in a third memory and a fourth memory of another facsimile apparatus connected to the facsimile apparatus, the third memory storing data used by a one-touch dial section provided in the another facsimile apparatus, the fourth memory storing data used by a speed dial section provided in the another facsimile apparatus; and an entry section for entering data of the first memory in the third memory, and data of the second memory in the fourth memory, the entry section entering at least some of the data stored in the first memory in the fourth memory when the detecting section finds that an amount of data stored in the first memory exceeds a vacant memory space in the third memory, and that an amount of data stored in the second memory is smaller than a vacant memory space in the fourth memory.

According to the present invention, the entry section enters at least some of the stored data of the first memory in the fourth memory when the size of stored data in the first memory exceeds the vacant memory space of the third memory and when the size of stored data in the second memory is smaller than the vacant memory space of the fourth memory.

For example, when some of the stored data in the first memory cannot be entered in the third memory, these data are entered in the vacant memory space of the fourth memory. In this way, overflow one-touch dial data can be reduced or eliminated.

The present invention therefore provides a facsimile apparatus that can minimize or eliminate overflow one-touch dial data or overflow speed dial data.

In order to achieve the foregoing feature, a facsimile apparatus of the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; a second memory for storing data used by the speed dial section; and an entry section for entering data of the first memory before data of the second memory in a vacant memory space of at least one of a third memory and a fourth memory respectively storing data used by a one-touch dial section and a speed dial section provided in another facsimile apparatus connected to the facsimile apparatus, the data of the first memory being entered regardless of whether it is used for the one-touch dial section or the speed dial section of the another facsimile apparatus.

According to the present invention, in order to enter the one-touch dial data or speed dial data in a different facsimile apparatus, the entry section enters the one-touch dial data of the first memory before the speed dial data of the second memory in a vacant memory space of at least one of a third memory and a fourth memory respectively storing data used by a one-touch dial section and a speed dial section provided in another facsimile apparatus connected to the facsimile apparatus, the one-touch dial data of the first memory being entered regardless of whether it is used for the one-touch dial section or the speed dial section of the another facsimile apparatus.

For example, the data of the first memory is entered in the third memory, and the data of the second memory is entered in the third memory. The data of the first memory that could not be entered in the third memory are entered in the fourth memory. The data of the second memory that could not be entered in the third memory are entered in the fourth memory.

In this case, the data of the second memory is first entered in the third memory when the size of stored data in the second memory exceeds the vacant memory space of the fourth memory, thereby enabling at least some of the overflow data to be entered in the third memory. As a result, overflow speed dial data can be reduced or eliminated.

Comparing speed dials and one-touch dials, the one-touch dials can be set up with a single key, as compared with the speed dials that require a combination of two or three keys. Therefore, the one-touch dials are generally more convenient than the speed dials.

Thus, first entering the one-touch dial data of the first memory offers a more convenient way of using the facsimile apparatus, because in this case the number of entries for the one-touch dial data can be increased in the destination facsimile apparatus receiving the one-touch dial data.

In order to achieve the foregoing feature, a facsimile apparatus of the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; a second memory for storing data used by the speed dial section; a frequency measuring section for measuring and storing, for each destination, frequency by which data stored in the first memory and data stored in the second memory are used; and an entry section for entering the data of the first memory and the data of the second memory, in the order of the highest frequency to the lowest frequency of use as measured by the frequency measuring section, first in a vacant memory space of a third memory and then a vacant memory space of a fourth memory, the third memory and the fourth memory being provided in another facsimile apparatus connected to the facsimile apparatus, and respectively storing data used by a one-touch dial section and a speed dial section provided in the another facsimile apparatus.

According to the present invention, for each destination, the frequency measuring section measures the frequency by which the stored data of the first memory is used by the one-touch dial section. The frequency by which the stored data in the second memory is used by the speed dial section is also measured for each destination by the frequency measuring section. The result of measurement is stored in the first memory or second memory along with the data to be sent to their destinations, for example. The measurement of frequency may be carried out in any manner. For example, the frequency may be updated and increased every time the data is used. Alternatively, the frequency of unused data may be decreased on a regular basis, for example.

In order to enter the one-touch dial data or speed dial data in a different facsimile apparatus, the one-touch dial data in the first memory and the speed dial data in the second memory are entered, in the order of the highest frequency to the lowest frequency as measured by the frequency measuring section, first in a vacant memory space of the third memory and then in a vacant memory space of the fourth memory in the different facsimile apparatus.

For example, the data of the first memory is entered in the third memory according to the frequency of use, and the data of the second memory is stored in the third memory according to the frequency of use. The data of the first memory that could not be entered in the third memory are entered in the fourth memory according to the frequency of use. The data of the second memory that could not be entered in the third memory are entered in the fourth memory according to the frequency of use.

In this case, the data of the second memory is first entered in the third memory when the size of stored data in the second memory exceeds the vacant memory space of the fourth memory, thereby enabling at least some of the overflow data to be entered in the third memory. As a result, overflow speed dial data can be reduced or eliminated.

Comparing speed dials and one-touch dials, the one-touch dials can be set up with a single key, as compared with the speed dials that require a combination of two or three keys. Therefore, the one-touch dials are generally more convenient than the speed dials.

Thus, giving priority to the third memory offers a more convenient way of using the facsimile apparatus, because in this case the number of entries for the one-touch dial data can be increased in the destination facsimile apparatus receiving the one-touch dial data.

Further, by entering data according to the frequency of use, it is ensured that frequently used data are entered in the destination facsimile apparatus. This is effective in maintaining usability of the facsimile apparatus. Further, usability can be improved because the order of data entry is determined by the frequency by which data is used in the facsimile apparatus.

By thus entering the stored data of the first memory and second memory in the third memory and fourth memory not by maintaining the state of stored data but by changing the order of data entry based on the frequency of use, usability of the facsimile apparatus can be improved.

In order to achieve the foregoing feature, a facsimile apparatus of the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; a second memory for storing data used by the speed dial section; a detecting section for finding a vacant memory space in a third memory and a fourth memory of another facsimile apparatus connected to the facsimile apparatus, the third memory storing data used by a one-touch dial section provided in the another facsimile apparatus, the fourth memory storing data used by a speed dial section provided in the another facsimile apparatus; a frequency measuring section for measuring and storing, for each destination, frequency by which data stored in the first memory and data stored in the second memory are used; and an entry section for entering the data of the first memory in the third memory when the detecting section finds that an amount of data stored in the first memory is smaller than the vacant memory space in the third memory, and entering the data of the second memory first in the vacant memory space of the third memory and then in the vacant memory space of the fourth memory in the order of the highest frequency to the lowest frequency of use as measured by the frequency measuring section.

According to the present invention, when the size of stored data in the first memory is smaller than the vacant memory space of the third memory, the entry section first enters at least some of the stored data in the second memory, in the order of the highest frequency to the lowest frequency of use, in the third memory.

For example, the stored data in the first memory is entered in the vacant memory space of the third memory. Then, the data of the second memory is entered in the remaining vacant memory space of the third memory in the order of the highest frequency to the lowest frequency of use. The data of the second memory that could not be entered in the third memory are entered in the fourth memory in the order of the highest frequency to the lowest frequency of use, for example.

Comparing speed dials and one-touch dials, the one-touch dials can be set up with a single key, as compared with the speed dials that require a combination of two or three keys. Therefore, the one-touch dials are generally more convenient than the speed dials.

Thus, first entering the data of the second memory in the third memory offers a more convenient way of using the facsimile apparatus, because in this case the number of entries for the one-touch dial data can be increased in the destination facsimile apparatus receiving the one-touch dial data.

Further, by entering data according to the frequency of use, it is ensured that frequently used data are entered in the destination facsimile apparatus. This is effective in maintaining usability of the facsimile apparatus. Further, usability can be improved because the order of data entry is determined by the frequency by which data is used in the facsimile apparatus.

Further, with the data of the first memory entered, the data of the second memory is first entered in the third memory with priority. In this way, overflow speed dial data can be reduced or eliminated.

Further, in order to take advantage of the benefit of one-touch dials over speed dials, frequently used speed dial numbers are reentered as one-touch dial numbers for improved usability. This is different from the foregoing configuration in which the data are reentered when there is overflow speed dial data in data transfer. In the instant configuration, the speed dial data are entered in the one-touch dial memory regardless of the presence or absence of overflow speed dial data.

In order to achieve the foregoing feature, a facsimile apparatus of the present invention includes: a speed dial section for calling, when a speed dial number assigned by a combination of numeric keys is selected, a destination assigned by the speed dial number; a one-touch dial section for calling, when a one-touch dial number assigned by one of a plurality of keys independently provided from the numeric keys is selected, a destination assigned by the one-touch dial number; a group dial section, provided for multicast transmission to multiple destinations, for assigning a group dial number to a predetermined key so as to enter a plurality of destinations using at least one of a speed dial number in the speed dial section, a one-touch dial number in the one-touch dial section, and a facsimile number of a target destination, and calling the plurality of destinations with the group dial number when the group dial number is selected; and an entry section for entering data used by the one-touch dial section and data used by the speed dial section in another facsimile apparatus connected to the facsimile apparatus, the entry section entering the data of the one-touch dial section in a speed dial memory of the another facsimile apparatus according to a memory size of the facsimile apparatus, and entering the one-touch dial number as a speed dial number, or the entry section entering the data of the speed dial section in a one-touch dial memory of the another facsimile apparatus according to a memory size of the facsimile apparatus, and entering the speed dial number as a one-touch dial number, and the entry section entering the data of the group dial section in the another facsimile apparatus, by modifying the data according to the one-touch dial number or the speed dial number entered in the another facsimile apparatus.

According to the present invention, the facsimile apparatus enters one-touch dial data and speed dial data in the destination facsimile apparatus.

For example, the one-touch dial data are entered in the speed dial memory of the destination facsimile apparatus according to the memory size of the destination facsimile apparatus. In this case, the destination facsimile apparatus assigned previously by a one-touch dial number is reassigned by a speed dial number. Alternatively, the speed dial data are entered in the one-touch dial memory of the destination facsimile apparatus. In this case, the destination facsimile apparatus assigned previously by a speed dial number is reassigned by a one-touch dial number.

The entry section then modifies the group dial data according to the new one-touch dial number or new speed dial number, and enters the modified group dial data in the destination facsimile apparatus. By thus modifying the group dial data according to the transferred one-touch dial data or speed dial data, the group dial data can also be used in the destination facsimile apparatus. In addition, resetting of the group dial data will not be required.

Note that, the simultaneous transmission to multiple destinations, in a strict sense, is not just limited to transmission that is carried out instantaneously. Instead, transmission may be carried out sequentially to multiple destinations by selecting one of the destinations. That is, the simultaneous transmission as used herein may be regarded as multicast transmission.

In order to achieve the foregoing feature, the present invention provides a data entry method for a facsimile apparatus for entering speed dial data and one-touch dial data of a first facsimile apparatus in a second facsimile apparatus, the first facsimile apparatus and the second facsimile apparatus each including a speed dial section for calling, when numeric keys are selected, a destination assigned by a combination of the numeric keys, and a one-touch dial section for calling, when one of a plurality of keys independently provided from the numeric keys is selected, a destination assigned by the selected key, and the method includes the step of: entering at least some of the speed dial data stored in the first facsimile apparatus in a memory in the one-touch dial section of the second facsimile apparatus, or entering at least some of the one-touch dial data stored in the first facsimile apparatus in a memory in the speed dial section of the second facsimile apparatus.

With this method, overflow one-touch dial data can be reduced or eliminated that is caused when the size of one-touch dial data in the first facsimile apparatus exceeds the vacant memory space of the one-touch dial memory in the second facsimile apparatus. The method also reduces or eliminates overflow speed dial data that is caused, for example, when the size of speed dial data in the first facsimile apparatus exceeds the vacant memory space of the speed dial memory in the second facsimile apparatus.

Note that, the data entry method is not just limited for use by the first facsimile apparatus. For example, the data entry method may be a data acquiring method that is carried out by the second facsimile apparatus. Further, the data entry method may be carried out, for example, by a host computer connected to the first facsimile apparatus and the second facsimile apparatus.

For a fuller understanding of the nature and advantages of the invention, reference should be made to the ensuing detailed description taken in conjunction with the accompanying drawings.

BRIEF DESCRIPTION OF THE DRAWINGS

In the drawings:

FIG. 3 is a view showing an example of a data structure of one-touch dial data and speed dial data stored in the facsimile apparatus;

FIG. 8(a) is a view showing an example of data transfer of one-touch dial data and speed dial data according to another embodiment of the facsimile apparatus of the present invention; FIG. 8(b) is a view showing another example of data transfer by the facsimile apparatus; FIG. 8(c) is a view showing yet another example of data transfer by the facsimile apparatus; FIG. 8(d) is a view showing still another example of data transfer by the facsimile apparatus; FIG. 8(e) is a view showing yet another example of data transfer by the facsimile apparatus; and FIG. 8(f) is a view showing still another example of data transfer by the facsimile apparatus;

FIG. 10(a) is a view showing an example of data transfer of one-touch dial data and speed dial data according to yet another embodiment of the facsimile apparatus of the present invention; FIG. 10(b) is a flowchart showing a procedure of updating frequency information in the facsimile apparatus; FIG. 10(c) is a flowchart showing a procedure of initializing frequency information in the facsimile apparatus; FIG. 10(d) is a flowchart showing another procedure of updating frequency information in the facsimile apparatus; and FIG. 10(e) is a flowchart outlining an example of data transfer by the facsimile apparatus;

FIG. 16(a) is a view showing an example of a data structure of stored group dial data according to still another embodiment of the facsimile apparatus of the present invention; FIG. 16(b) is a view showing an example of a data structure of one-touch dial data stored in the facsimile apparatus; and FIG. 16(c) is a view showing an example of a data structure of speed dial data stored in the facsimile apparatus;

FIG. 17(a) is a view showing an example of a data structure of stored group dial data according to yet another embodiment of the facsimile apparatus of the present invention; FIG. 17(b) is a view showing an example of a data structure of one-touch dial data stored in the facsimile apparatus; and FIG. 17(c) is a view showing an example of a data structure of speed dial data stored in the facsimile apparatus;

FIG. 18(a) is a view showing an example of a data structure of stored group dial data according to still another embodiment of the facsimile apparatus of the present invention; and FIG. 18(b) is a view showing an example of a data structure of one-touch dial data stored in the facsimile apparatus.

DESCRIPTION OF THE EMBODIMENTS

First Embodiment

A facsimile apparatus according to one embodiment of the present invention is adapted to transfer one-touch dial data and speed dial data to a different facsimile apparatus by maintaining the integrity of the stored data as much as possible, and carries out a special process when the data cannot be entered directly.

An exemplary embodiment of the present invention is described below with reference to FIG. 1 through FIG. 7.

Figure 2:
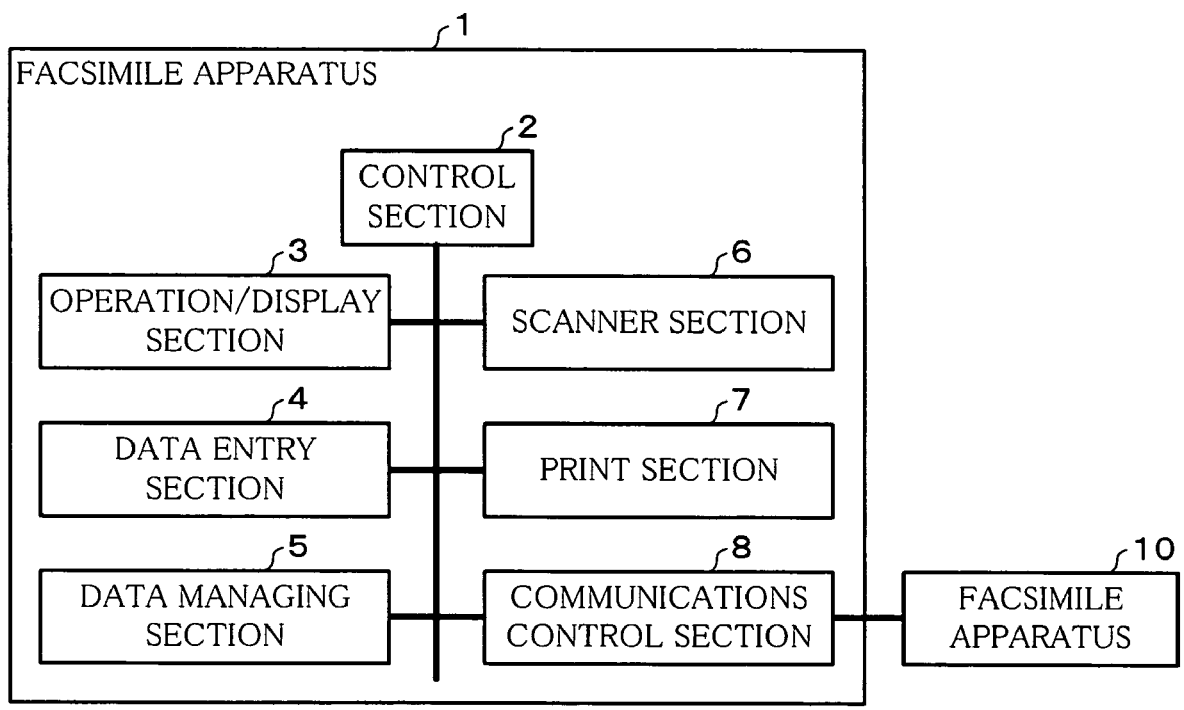
FIG. 2 is a block diagram schematically showing a configuration of the facsimile apparatus.

The facsimile apparatus 1 of the present embodiment (first facsimile apparatus) includes, as shown in FIG. 2, a control section 2, an operation/display section (speed dial section, one-touch dial section) 3, a data entry section (detecting section, entry section) 4, a data managing section (first memory, second memory) 5, a scanner section 6, a print section 7, and a communications control section 8.

The facsimile apparatus 1 sends and receives document data to and from other apparatuses via communication lines. For example, in order to send and receive document data, the facsimile apparatus 1 is connected to a facsimile apparatus 10 (different facsimile apparatus, second facsimile apparatus, third memory, fourth memory).

The facsimile apparatus 1 is equipped with speed dial and one-touch dial functions.

Speed dials enable facsimile transmission to a specific destination by allowing a user to enter a combination of usually two to three numbers through the numeric keys (ten-keys) of the facsimile apparatus. The combination of numbers used in speed dialing is generally shorter than the phone number (FAX number) of the destination facsimile apparatus, making speed dialing an efficient way of making facsimile transmission. For example, by assigning speed dial numbers to frequently called destinations, the operability and efficiency of facsimile transmission can be greatly improved. Note that, the speed dial numbers are not just limited to combinations of numeric keys. For example, speed dial numbers may be set based on combinations of numeric keys and designated keys.

One-touch dials enable facsimile transmission to a specific destination with the use of designated keys that are independently provided from the numeric keys. One-touch dialing uses only a single key to make transmission, and therefore is more convenient than speed dialing. For example, by assigning one-touch dial numbers to frequently called destinations, faxes can be sent even more easily and more efficiently.

The data of speed dial numbers and one-touch dial numbers entered in the facsimile apparatus 1 may be entered in a different facsimile apparatus, for example, such as the facsimile apparatus 10, by connecting the two facsimile apparatuses. For example, the facsimile apparatus 1 may be connected to a newly purchased facsimile apparatus as with the facsimile apparatus 10 shown in FIG. 2, and the data of speed dial numbers and one-touch dial numbers may be entered in this new facsimile apparatus.

The control section 2 controls the facsimile apparatus 1.

The operation/display section 3 is realized by a touch panel, including an operating section for operating the facsimile apparatus 1, and a display section for displaying a state of the facsimile apparatus 1. The operation/display section 3 detects user instructions for starting transmission or setting operations of the facsimile apparatus 1, and sends these instructions to the control section 2. The control section 2 outputs an operating state of the facsimile apparatus 1, and the operation/display section 3 displays it on the touch panel.

The operation/display section 3 includes numeric keys 0 to 9 used for speed dialing, and one-touch dial keys A to J used for one-touch dialing. These speed dial keys and one-touch dial keys may be realized on the touch panel. The one-touch dial keys A to J may be used with a designated key to serve as one-touch dial keys K to T. When the one-touch dial keys A to J are realized on the touch panel, the one-touch dial keys A to J may function as the one-touch dial keys K to T with the press of a designated key.

The data entry section 4 enters the data of speed dial numbers and one-touch dial numbers in the data managing section 5 for each destination. When a user selects a setting for data entry, the data entry section 4 causes the operation/display section 3 to display a menu for data entry. Upon detecting the entered data by the user, the data entry section 4 stores the data in a predetermined format in the data managing section 5.

The data entry section 4 also enters data of speed dial numbers and one-touch dial numbers in a different facsimile apparatus, such as the facsimile apparatus 10 shown in FIG. 2. Details of data entry to a different facsimile apparatus will be described later.

The data managing section 5 is a memory for storing data of speed dial numbers and one-touch dial numbers of the facsimile apparatus 1 for each destination.

The scanner section 6 is a reading section for reading documents to be transmitted. The print section 7 prints image data. For example, the print section 7 carries out a print job for received document data. The communications control section 8 is provided to control data transmission.

When transmitting document data, the facsimile apparatus 1 finds that a user has selected the one-touch dial keys of the operation/display section 3, and connects itself to the apparatus of the selected destination via the communications control section 8. Under the control of the control section 2, the facsimile apparatus 1 then reads the document data through the scanner section 6, and outputs the image data through the communications control section 8 after it is encoded by the control section 2.

When receiving document data, the facsimile apparatus 1 receives encoded image data through the communications control section 8, and outputs the data through the print section 7 for a print job after the data is decoded by the control section 2.

Referring to FIG. 3, the following will describe how the facsimile apparatus 1 stores data of speed dial numbers and one-touch dial numbers.

FIG. 3 shows some of the data stored in the data managing section 5 of the facsimile apparatus 1, as one example. The data are classified under headings including TYPE, ONE-TOUCH (SPEED) DIAL NUMBER, DESTINATION NAME, DESTINATION NAME IN KANA, PHONE (FAX) NUMBER, AND ATTRIBUTE OF COMMUNICATIONS. Note that, the headings shown in FIG. 3 are just one example, and other heading may be used.

The heading TYPE indicates whether the data is speed dial data or one-touch dial data.

The heading ONE-TOUCH (SPEED) DIAL NUMBER indicates the assigned key(s) set up as a speed dial number or one-touch dial number. In the example of FIG. 3, a speed dial is set up by entering numbers 1, 2, and 3 in this order. For the one-touch dial, A is pressed.

The heading DESTINATION NAME includes names of destinations in Chinese characters. The destination names are also listed in kana characters under the heading DESTINATION NAME IN KANA. The heading PHONE (FAX) NUMBER includes the FAX numbers of the destinations. The list may include phone numbers of the destinations under the heading PHONE NUMBER. The heading ATTRIBUTE OF COMMUNICATIONS indicates attributes of facsimile transmission, including communication speed.

The stored data of different destinations in the data managing section 5 of the facsimile apparatus 1 are tagged by IDs (not shown), for example.

It should be noted here that, in the present embodiment, the speed dial number and one-touch dial number assigned to different destinations have substantially the same data structure. However, the present invention is not just limited to this example. When the speed dial number and one-touch dial number have different data structures for their destinations, the data entry section 4 may convert the data for consistency by suitably correlating the data of different headings. However, it is more advantageous to provide the same headings for the data of speed dial numbers and one-touch dial numbers as above, because it does not require correlating headings and offers more flexibility.

In the following, description is made as to how the entered data of the facsimile apparatus 1 are entered in a different facsimile apparatus like the facsimile apparatus 10 shown in FIG. 2.

Figure 1:
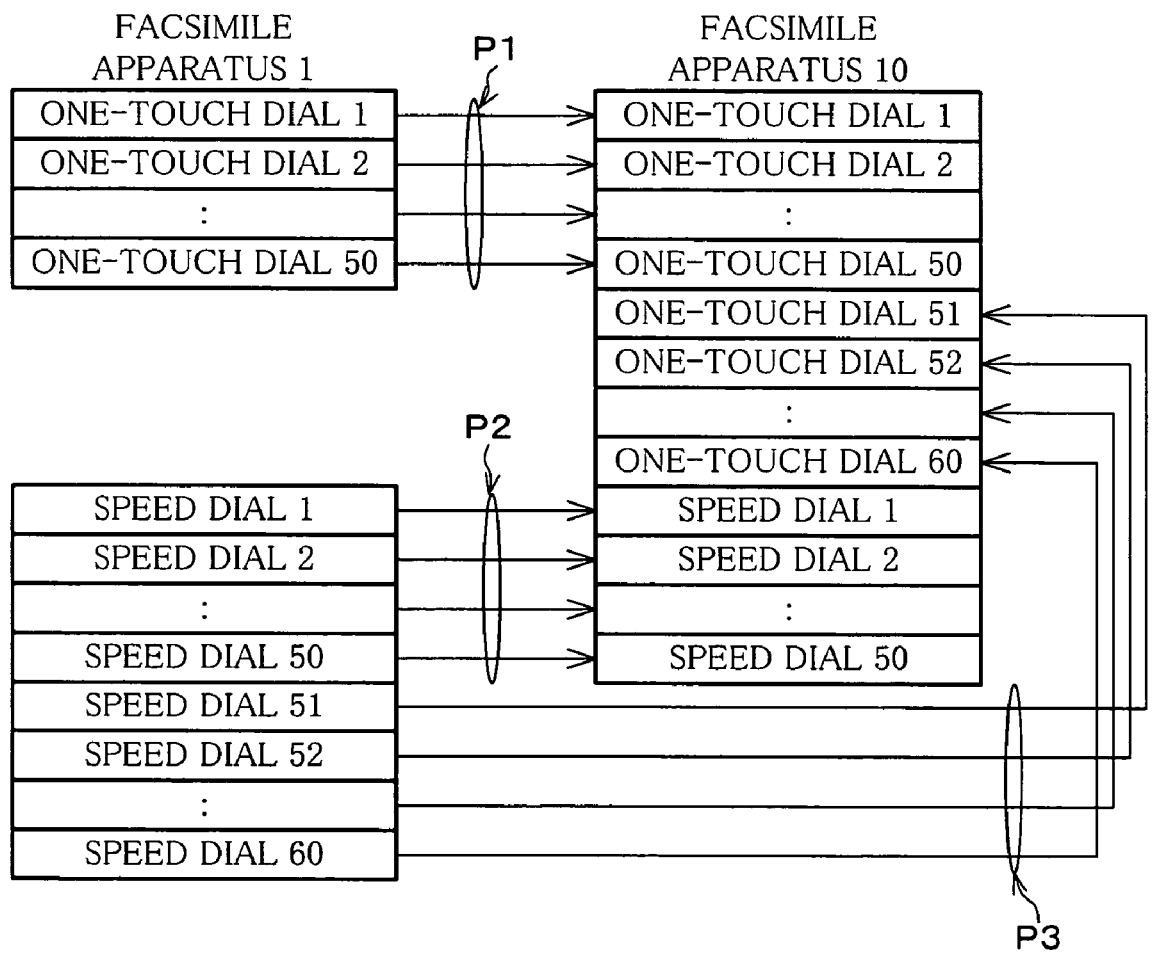
FIG. 1 is a view showing an example of data transfer of one-touch dial data and speed dial data according to one embodiment of a facsimile apparatus of the present invention.

In this first example, it is assumed that the data managing section 5 of the facsimile apparatus 1 has 50 entries for the data of one-touch dials, and 60 entries for the data of speed dials, as shown in FIG. 1. In FIG. 1, "ONE TOUCH DIAL 1", corresponds to one-touch dial data with an ID number 1. Note that, the number of entries for the data of one-touch dial numbers and the number of entries for the data of speed dial numbers in the data managing section 5 of the facsimile apparatus 1 are not particularly limited as long as they are not less than 50 and not less than 60, respectively.

It is assumed that the facsimile apparatus 10 can have up to 60 entries for the data of one-touch dial numbers, and 50 entries for the data of speed dial numbers.

With this structure, the data entry section 4 of the facsimile apparatus 1 detects the respective memory sizes of the facsimile apparatus 10 for the one-touch dial numbers and speed dial numbers.

In this example, the size of stored speed dial data (60 entries) in the data managing section 5 of the facsimile apparatus 1 exceeds the memory size (50 entries) of the facsimile apparatus 10 for the speed dial numbers. Similarly, the size of stored one-touch dial data (50 entries) in the data managing section 5 of the facsimile apparatus 1 is smaller than the memory size (60 entries) of the facsimile apparatus 10 for the one-touch dial numbers.

The data entry section 4 of the facsimile apparatus 1 transfers the one-touch dial data with ID numbers 1 through 50 (one-touch dials 1 through 50) to the facsimile apparatus 10, and enters these data as one touch dials 1 through 50 (P1). Then, the speed dial data with ID numbers 1 through 50 (speed 1 through 50) are transferred to the facsimile apparatus 10 and entered therein as speed dials 1 through 50 (P2).

The remaining speed dial data with ID numbers 51 through 60 (speed dials 51 through 60) in the facsimile apparatus 1 are transferred to the facsimile apparatus 10 and are entered in a vacant memory space for the one-touch dial numbers (one-touch dials 51 through 60) in the facsimile apparatus 10.

This completes data entry from the facsimile apparatus 1 to the facsimile apparatus 10. In the described manner, despite the fact that the facsimile apparatus 1 and the facsimile apparatus 10 can have different numbers of speed dial data and one-touch dial data, the excess speed dial data (speed dials 51 through 60) of the facsimile apparatus 1 can be entered in a vacant memory space for the one-touch dial numbers (one-touch dials 51 through 60) in the facsimile apparatus 10, thereby ensuring that all the data are entered.

Note that, in the exemplary structure described with reference to FIG. 1, the memory space of the facsimile apparatus 10 (destination) is an empty space containing no data. However, the present invention is not just limited to this example. In an alternative example, the memory space of the facsimile apparatus 10 may contain data of the facsimile apparatus 10 itself. Even in this case, the foregoing effect can still be obtained by carrying out the process of FIG. 1 for a vacant memory space of the facsimile apparatus 10.

Figure 4:
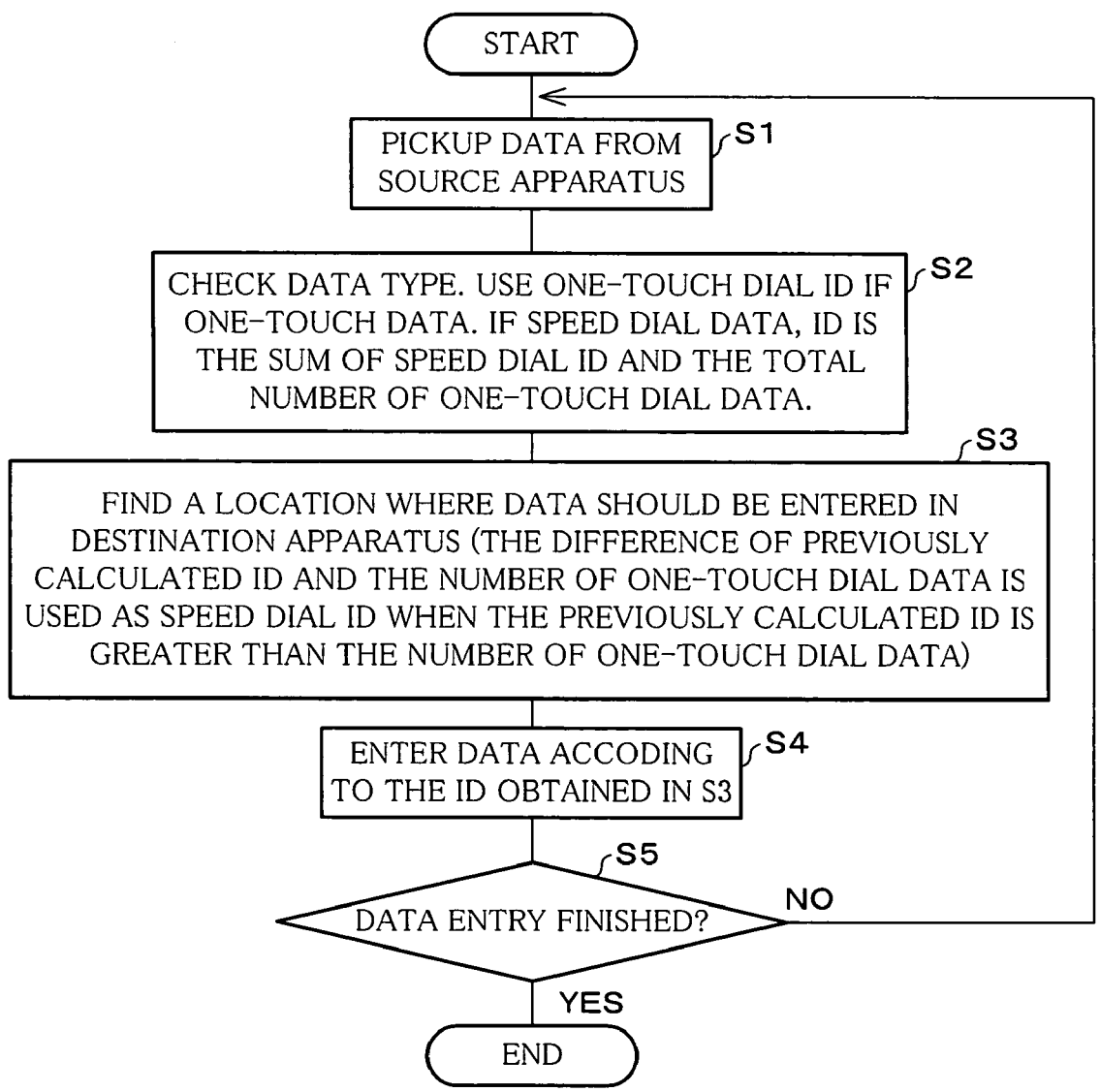
FIG. 4 is a flowchart outlining an example of data transfer by the facsimile apparatus.

Referring to FIG. 4, the following briefly describes an exemplary procedure of the data entry.

It is assumed here that data are transmitted from the facsimile apparatus 1 (source apparatus) to the facsimile apparatus 10 (destination apparatus). First, the facsimile apparatus 1 finds the respective numbers of one-touch dial data and speed dial data stored in the data managing section 5. Then, one of the data (target data) is picked up in the source apparatus, as in S1 of FIG. 4. In S2, a transmission ID number is given to the data according to the type of data (speed dial data or one-touch dial data). For example, when the data is one-touch dial data, the ID number already given to this data is used as a transmission ID number. For speed dial data, the transmission ID number is the sum of the total number of one-touch dial data and the speed dial number of this speed dial data.

In S3, the data entry section 4 of the facsimile apparatus 1 detects the respective memory sizes of the speed dial memory and one-touch dial memory in the facsimile apparatus 10. Based on the result of detection, the data entry section 4 finds a location where the transferred data should be entered. For example, when the memory size of the one-touch dial memory in the facsimile apparatus 10 is smaller than the memory size of the one-touch dial memory in the facsimile apparatus 1, the difference between the number of data corresponding to the memory size of the one-touch dial memory in the facsimile apparatus 10 and the previously calculated transmission ID number is used as a speed dial ID number in the facsimile apparatus 10. The one-touch dial ID number and the speed dial ID number so obtained in the facsimile apparatus 10 specify the locations where the transmitted data should be entered. In S4, the data selected in S1 is transferred to a location specified by the ID number determined in S3. If it is determined in S3 that the data cannot be entered in the facsimile apparatus 10 due to a lack of memory space, the data is not transferred in S4.

In S5, it is determined whether unprocessed data remains in the facsimile apparatus 1. If YES, the sequence returns to S1, and the procedure is repeated. If No, the procedure is finished.

Figure 5:
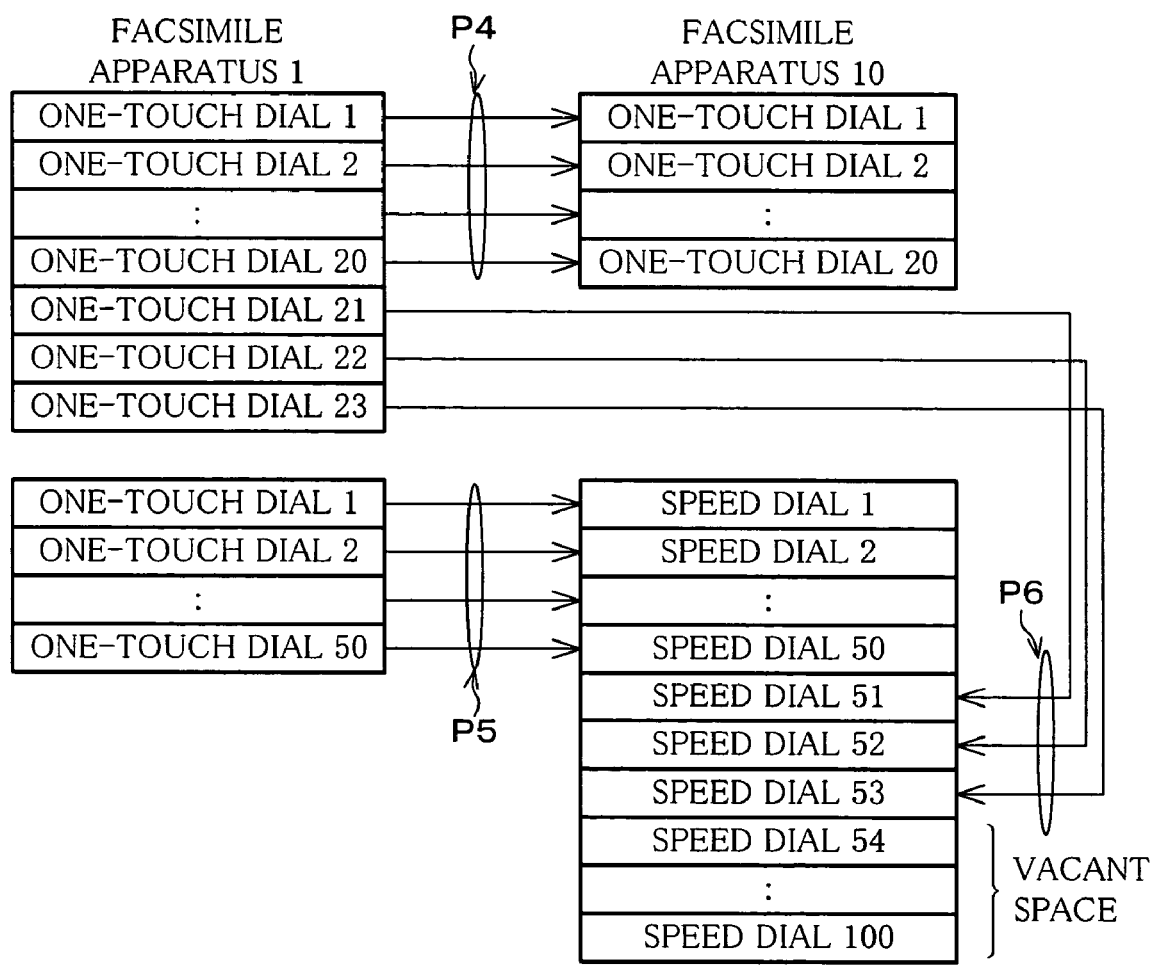
FIG. 5 is a view showing another example of data transfer of one-touch dial data and speed dial data by the facsimile apparatus.

Referring to FIG. 5, the following describes another example of how the stored data in the facsimile apparatus 1 are entered in a different facsimile apparatus (facsimile apparatus 10).

In this second example, it is assumed that the data managing section 5 of the facsimile apparatus 1 has 23 entries for the data of one-touch dial numbers, and 50 entries for the data of speed dial numbers.

It is also assumed that the facsimile apparatus 10 can have up to 20 entries for the data of one-touch dial numbers, and 100 entries for the data of speed dial numbers.

With this structure, the data entry section 4 of the facsimile apparatus 1 detects the respective memory sizes of the facsimile apparatus 10 for the one-touch dial numbers and speed dial numbers.

In this example, the size of the stored one-touch dial data (23 entries) in the data managing section 5 of the facsimile apparatus 1 exceeds the memory size (20 entries) of the facsimile apparatus 10 for the one-touch dial numbers. Similarly, the size of the stored speed dial data (50 entries) in the data managing section 5 of the facsimile apparatus 1 is smaller than the memory size (100 entries) of the facsimile apparatus 10 for the speed dial numbers.

The data entry section 4 of the facsimile apparatus 1 transfers the one-touch dial data with ID numbers 1 through 20 (one-touch dials 1 through 20) to the facsimile apparatus 10, and enters these data as one touch dials 1 through 20 (P4). Then, the speed dial data with ID numbers 1 through 50 (speed 1 through 50) are transferred to the facsimile apparatus 10 and entered therein as speed dials 1 through 50 (P5).

The remaining one-touch dial data with ID numbers 21 through 23 (one-touch dials 21 through 23) in the facsimile apparatus 1 are transferred to the facsimile apparatus 10 and are entered in a vacant memory space for the speed dial numbers (speed dials 51 through 53) in the facsimile apparatus 10. Here, the memory space (speed dials 53 through 100) for the speed dial numbers in the facsimile apparatus 10 remains empty.

This completes data entry from the facsimile apparatus 1 to the facsimile apparatus 10. In the described manner, despite the fact that the facsimile apparatus 1 and the facsimile apparatus 10 can have different numbers of speed dial data and one-touch dial data, the excess one-touch dial data (one-touch dials 21 through 23) of the facsimile apparatus 1 can be entered in a vacant memory space for the speed dial numbers (speed dials 51 through 53) in the facsimile apparatus 10, thereby ensuring that all the data are entered.

Note that, in the exemplary structure described with reference to FIG. 1, the memory space of the facsimile apparatus 10 (destination) is an empty space containing no data. However, the present invention is not just limited to this example. In an alternative example, the memory space of the facsimile apparatus 10 may contain data of the facsimile apparatus 10 itself. Even in this case, the foregoing effect can still be obtained by carrying out the process of FIG. 1 for a vacant memory space of the facsimile apparatus 10.

Figure 6:
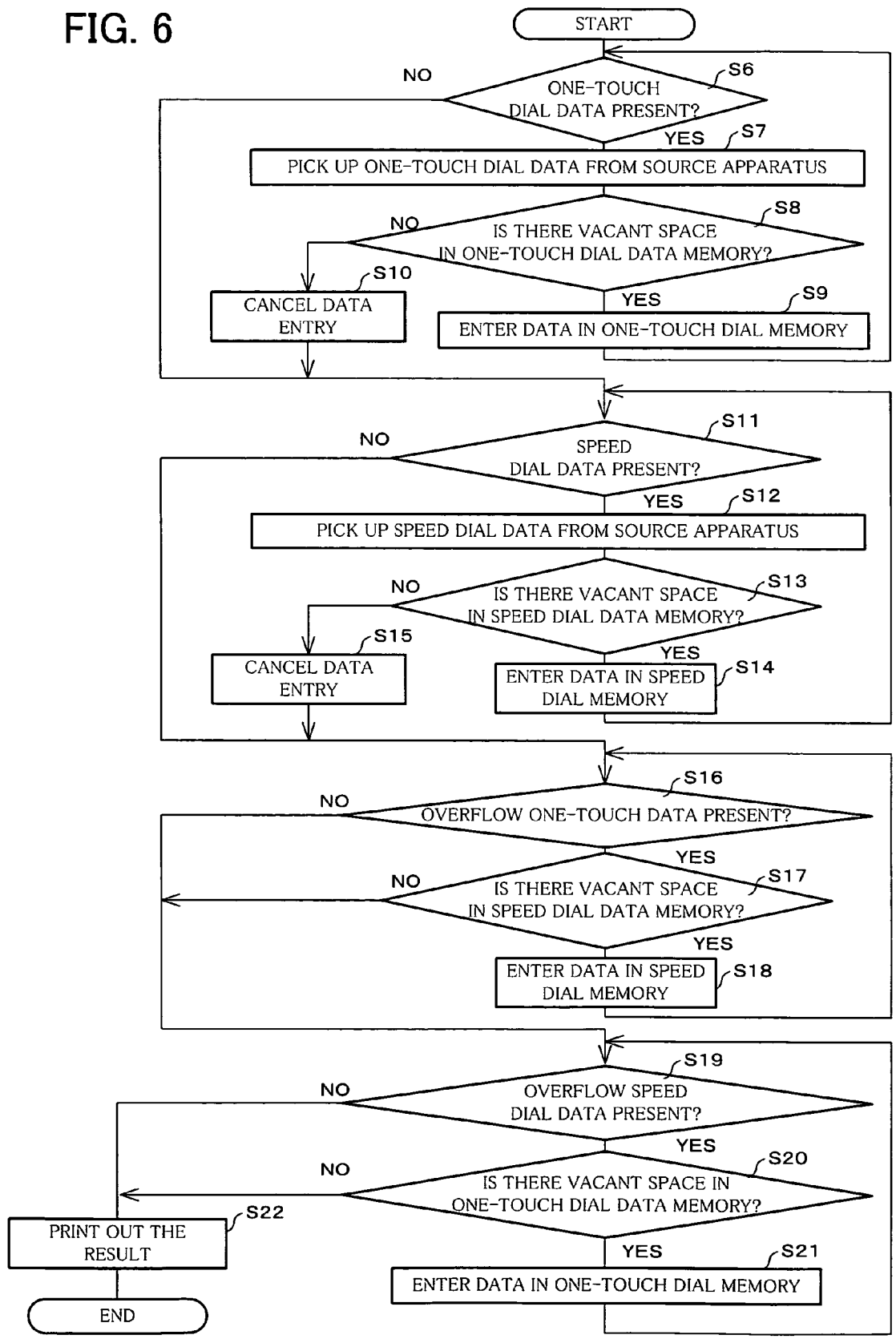
FIG. 6 is a flowchart specifically showing an example of data transfer by the facsimile apparatus.

Referring to FIG. 6, the following describes an exemplary process of the facsimile apparatus 1 in more detail.

In S6, the data entry section 4 of the facsimile apparatus 1 searches through the memory space for the one-touch dial numbers in the data managing section 5, so as to find the presence or absence of unprocessed data to be entered in the facsimile apparatus 10. If there is no unprocessed data, the sequence goes to S11.

If unprocessed data is found, the sequence goes to S7. In S7, one of the data is selected from the unprocessed data, and the sequence goes to S8. It is determined in S8 whether the memory space for the one-touch dial numbers in the facsimile apparatus 10 has a vacant space containing no data, for example. If YES in S8, the data selected in S7 is entered in S9 in the vacant space found in S8, and the sequence returns to S6. On the other hand, if no vacant space is found in S8, the data is not entered (data entry is cancelled, S10), and the sequence goes to S11.

In S11, the presence or absence of unprocessed data is determined in the stored data in the memory space for the speed dial numbers in the data managing section 5. If No, the sequence goes to S16. If YES, one of the speed dial data is selected from the unprocessed data, and the sequence goes to S13.

In S13, it is determined whether the memory space for the speed dial numbers in the facsimile apparatus 10 (destination apparatus) has a vacant space. If YES in S13, the selected data in S12 is entered in the vacant space found in S13, and the sequence returns to S11. On the other hand, if no vacant space is found in S13, data entry is cancelled in S15 and the sequence goes to S16. In this manner, data entry may be carried out by finding the presence or absence of a vacant space in the destination apparatus with respect to each data.

In S16, it is determined whether the stored data in the memory space for the one-touch dial numbers in the data managing section 5 of the facsimile apparatus 1 has unprocessed data to be entered in the memory space of the facsimile apparatus 10 (one-touch dial data that are left out). If unprocessed one-touch dial data is found in S16, the sequence goes to S17. If NO in S16, the sequence goes to S19.

Note that, if the sequence from S11 or S15 to S16 is the first time, the presence or absence of a vacant space may be determined in S8, and the presence or absence of cancelled data may be determined in S10. In this case, if cancelled data is found in S10, the sequence goes from S16 to S17. If there is no cancelled data in S10, the sequence goes from S16 to S19.

As in S13, it is determined in S17 whether the memory space for the speed dial numbers in the facsimile apparatus 10 (destination apparatus) has a vacant space. If YES in S17, the sequence goes to S18. If NO, the sequence goes to S19.

In S18, the unprocessed one-touch dial data found in S16 is entered in the vacant space found in S17, and the sequence returns to S16.

In S19, it is determined whether the stored data in the memory space for the speed dial numbers in the data managing section 5 of the facsimile apparatus 1 has unprocessed data to be entered in the memory space of the facsimile apparatus 10 (speed dial data that are left out). If unprocessed speed dial data is found in S19, the sequence goes to S20. If NO in S19, the sequence goes to S22.

In S20, it is determined whether the memory space for the one-touch dial numbers in the facsimile apparatus 10 (destination apparatus) has a vacant space. If YES in S20, the sequence goes to S21. If NO, the sequence goes to S22.

In S21, the unprocessed speed dial data found in S19 is entered in the vacant space found in S20, and the sequence returns to S19.

In S22, the result of data entry by the data entry section 4 is outputted for a print job with respect to each data transferred from the facsimile apparatus 1 to the facsimile apparatus 10. For example, the output print data includes the correspondence between the one-touch dial keys and their destinations, or between the speed dial keys and their destinations, with respect to each transferred data. The print job may be carried out by the print section 7 of the facsimile apparatus 1, or by the print section of the facsimile apparatus 10. By thus printing out the result of data entry, a user can easily recognize the result of data transfer.

In this manner, in the steps S6 through S10, the one-touch dial data of the facsimile apparatus 1 is entered in the one-touch dial memory space of the facsimile apparatus 10 by maintaining the integrity of the data as much as possible. Similarly, in the steps S11 through S15, the speed dial data of the facsimile apparatus 1 is entered in the speed dial memory space of the facsimile apparatus 10 by maintaining the integrity of the data as much as possible. In this way, usability is ensured also in the facsimile apparatus 10 (destination apparatus).

The subsequent steps of S16 through S18 and S19 through S21 ensures that overflow data are entered in a vacant space of the destination apparatus, thereby reducing or preventing omission of data in data transfer.

Note that, the steps S6 through S10 may be carried out by first detecting the capacity of the memory space for the one-touch dial numbers in the facsimile apparatus 10, as described with reference to FIG. 1 and FIG. 5 for example, and then picking up and entering data that can fit in the vacant space so found, as indicated by P1 in FIG. 1 and P4 in FIG. 5.

Similarly, the steps S11 through S15 may be carried out by first detecting the capacity of the memory space for the speed dial numbers in the facsimile apparatus 10, as described with reference to FIG. 1 and FIG. 5 for example, and then picking up and entering data that can fit in the vacant space so found, as indicated by P2 in FIG. 1 and P5 in FIG. 5.

The steps S16 through 18 may be carried out by transferring and entering the overflow one-touch dial data at once in a vacant memory space for the speed dial numbers in the facsimile apparatus 10, as indicated by P6 in FIG. 5 for example.

Similarly, the steps S19 through 21 may be carried out by transferring and entering the overflow speed dial data at once in a vacant memory space for the one-touch dial numbers in the facsimile apparatus 10, as indicated by P3 in FIG. 1 for example.

Figure 7:
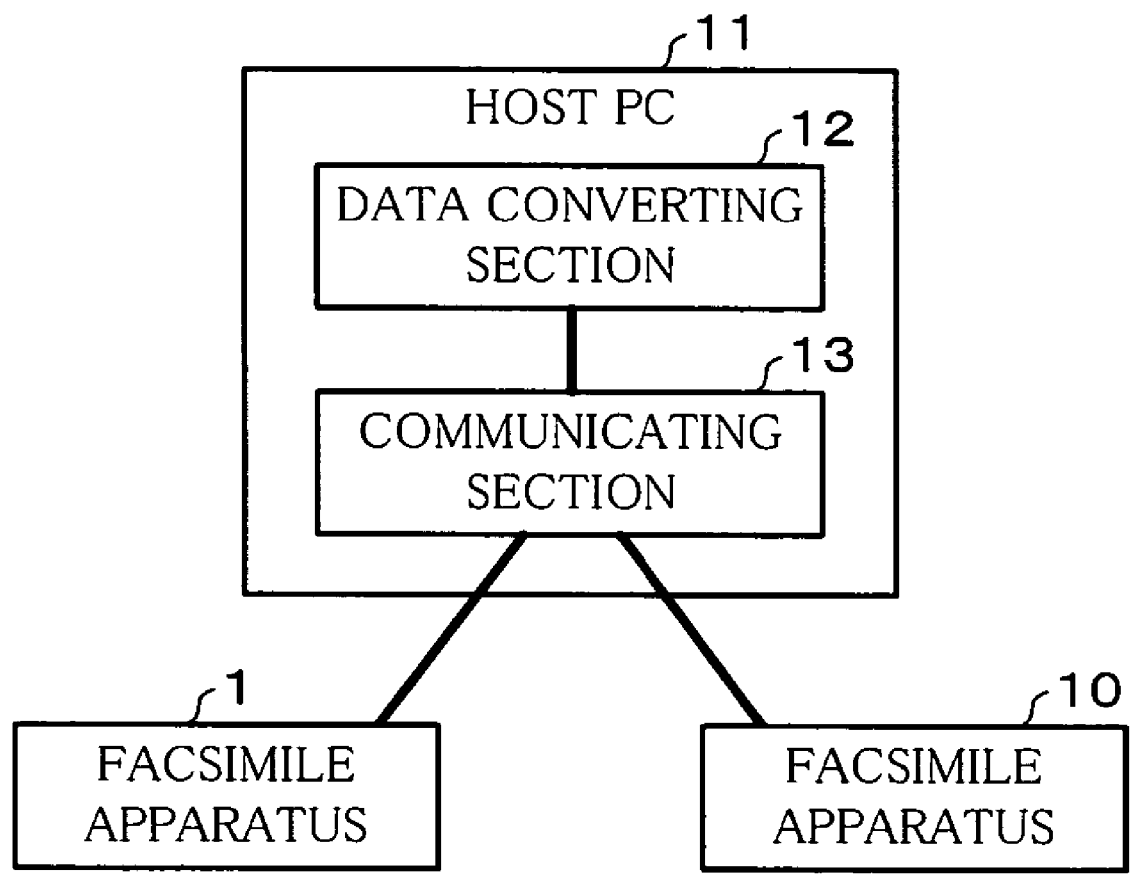
FIG. 7 is a block diagram showing an example of how the facsimile apparatus is connected to a different facsimile apparatus.

It should also be noted that the data transfer from the facsimile apparatus 1 to the facsimile apparatus 10 is not just limited to the implementation shown in FIG. 1, in which the facsimile apparatus 1 and the facsimile apparatus 10 are directly connected to each other. For example, the facsimile apparatus 1 and the facsimile apparatus 10 may be connected to each other via a host PC (Personal Computer) 11, as illustrated in FIG. 7.

The host PC 11 includes a data converting section 12 and a communicating section 13. The data converting section 12 is provided to convert data structure into proper form when the one-touch dial data and the speed dial data have different data structures between the facsimile apparatus 1 and the facsimile apparatus 10. The communicating section 13 is provided to mediate communications between the facsimile apparatus 1 and the facsimile apparatus 10. For example, the communicating section 13 can mediate communications between the facsimile apparatus 1 and the facsimile apparatus 10 even when these two facsimile apparatuses have different communications speeds.

The foregoing embodiment described data transfer from the facsimile apparatus 1 to the facsimile apparatus 10 as initiated by the data entry section 4. However, the present invention is not just limited to this implementation. For example, a data entry section (not shown) of the facsimile apparatus 10 may be adapted to acquire stored data in the facsimile apparatus 1. Alternatively, for example, the host PC 11 as shown in FIG. 7 may be used to acquire stored data in the facsimile apparatus 1 and enter the data in the facsimile apparatus 10. In any case, the size of stored data in the facsimile apparatus 1 and the size of stored data in the facsimile apparatus 10 are detected and compared for the one-touch dial data and speed dial data, and the stored data in the facsimile apparatus 1 are entered in the facsimile apparatus based on the result of detection and comparison. Specifically, the one-touch dial data in the facsimile apparatus 1 is entered in the speed dial memory space of the facsimile apparatus 10, or the speed dial data of the facsimile apparatus 1 is entered in the one-touch dial memory space of the facsimile apparatus 10. In this way, omission of speed dial data or one-touch dial data can be reduced or prevented.

Second Embodiment

Referring to FIG. 8(a) through FIG. 8(c), and FIG. 9, the following will describe another embodiment of the present invention.

A facsimile apparatus of the present embodiment have substantially the same schematic structure as the facsimile apparatus 1 of the First Embodiment. The present embodiment differs from the First Embodiment in the data transfer process to the facsimile apparatus 10. Accordingly, the facsimile apparatus of the present embodiment will also be described as the facsimile apparatus 1, and the following description only deals with the differences from the First Embodiment.

The facsimile apparatus 1 of the present embodiment is adapted to transfer and enter one-touch dial data and speed dial data in a different facsimile apparatus by giving priority to the one-touch dial data.

In order to describe the operation of the facsimile apparatus 1, the following considers facsimile apparatuses of different models A, B, C, and D, each having the configuration and functions of the facsimile apparatus 1. FIG. 8(*a*) through FIG. 8(*c*) describe how data are transferred and exchanged between the facsimile apparatuses of these different models A, B, C, and D.

As shown in FIG. 8(*a*), it is assumed here that the model A has a memory space with 50 entries for the one-touch dial data, and 300 entries for the speed dial data. The model B has a memory space with 350 entries for the one-touch dial data, and 0 entries for the speed dial data. Further, as shown in FIG. 8(*b*), the model C has a memory space with 20 entries for the one-touch dial data, and 100 entries for the speed dial data. The model D has a memory space with 100 entries for the one-touch dial data, and 250 entries for the speed dial data, as shown in FIG. 8(*c*).

FIG. 8(*a*) shows data exchange between model A and model B. As shown in FIG. 8(*a*), the data transfer from model A to model B is carried out, for example, by transferring the one-touch dial data (one-touch dials 1 through 50), indicated by Ad1, to one-touch dials 1 through 50, indicated by Bd1, and by transferring the speed dial data (speed dials 1 through 300), indicated by Ad2, to one-touch dials 51 through 350, indicated by Bd2. Conversely, the data transfer from model B to model A is carried out by transferring the data in Bd1 and Bd2 to Ad1 and Ad2, respectively.

When model B has a memory space only for the one-touch dial data as in this case, the one-touch dial data and speed dial data may be treated equally in the data exchange.

FIG. 8(*b*) shows data exchange between model A and model C. As shown in FIG. 8(*b*), the data transfer from model A to model C is carried out, for example, by transferring the one-touch dial data (one-touch dials 1 through 20), indicated by Ad3, to one-touch dials 1 through 20, indicated by Cd1. The one-touch dial data (one-touch dials 21 through 50), indicated by Ad4, are transferred to speed dials 31 through 30, indicated by Cd2. The speed dial data (speed dials 1 through 70), indicated by Ad5, are transferred to speed dials 31 through 100, indicated by Cd3. The speed dial data (speed dials 71 through 300), indicated by Ad6, are treated as overflow data and are not transferred, because these is no memory space for these data. Conversely, the data transfer from model C to model A is carried out by transferring the data in Cd1, Cd2, and Cd3 to Ad3, Ad4, and Ad5, respectively.

In this manner, the present embodiment may be adapted to transfer one-touch dial data before speed dial data, and any overflow data may not be transferred when the one-touch dial data is followed by the speed dial data. In this way, data transfer can be carried out by giving priority to the one-touch dial data.

FIG. 8(*c*) shows data transfer between model A and model D. As shown in FIG. 8(*c*), the data transfer from model A to model D is carried out, for example, by transferring the one-touch dial data (one-touch dials 1 through 50), indicated by Ad7, to one-touch dials 1 through 50, indicated by Dd1. The speed dial data (speed dials 1 through 50), indicated by Ad8, are transferred to one-touch dials 51 through 100, indicated by Dd2. The speed dial data (speed dials 51 through 300), indicated by Ad9, are transferred to speed dials 1 through 250, indicated by Dd3.

In this example, model A and model D have different memory sizes for the one-touch dial data and speed dial data, even though the total memory sizes are the same. In this case, by processing the one-touch dial data first as shown in FIG. 8(*b*), the one-touch dial data can be entered with priority, and usability is improved.

Figure 9:
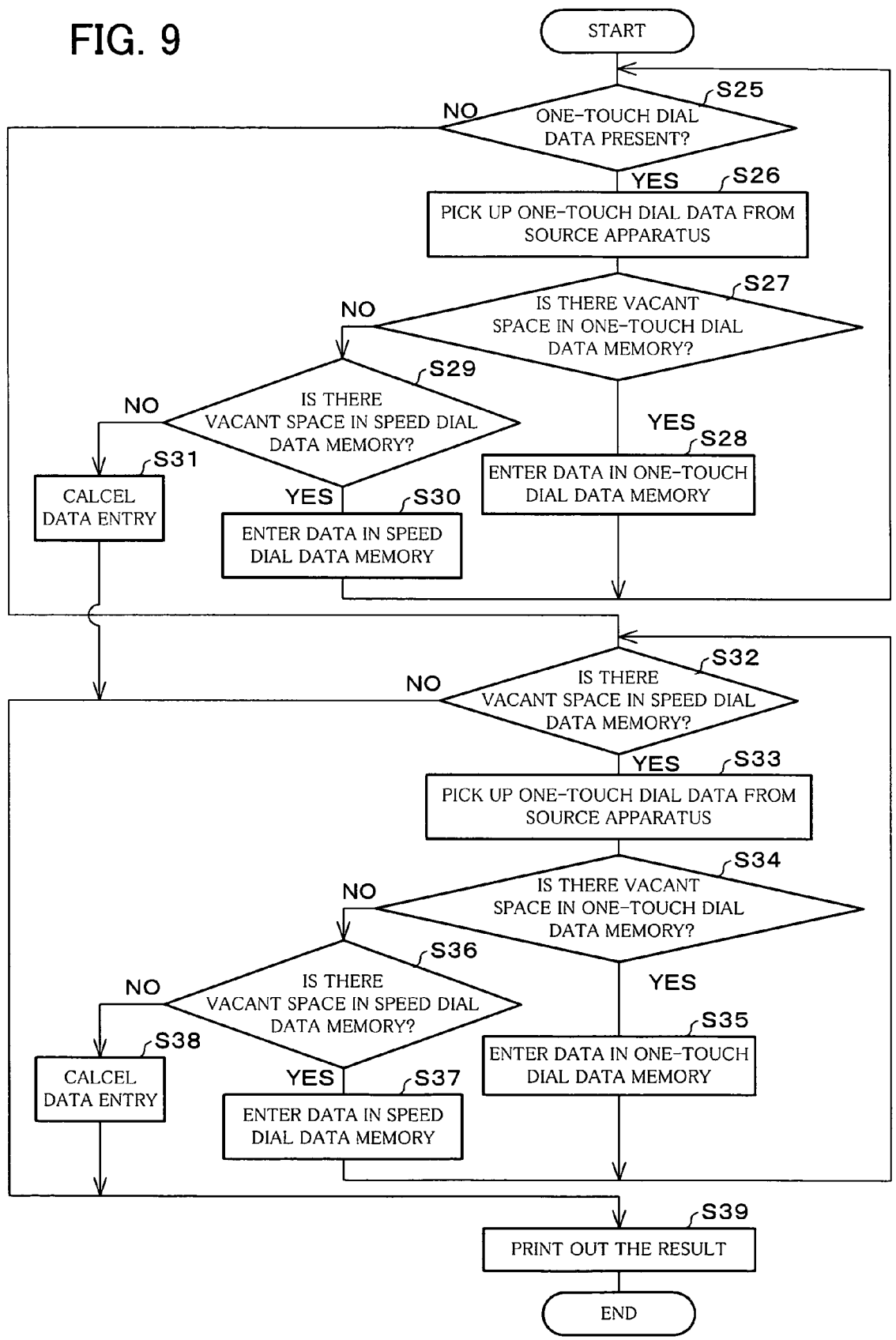
FIG. 9 is a flowchart specifically showing an example of data transfer according to the facsimile transmission illustrated in FIG. 8(a) through FIG. 8(f)

Referring to FIG. 9, the following describes an exemplary data transfer process of the facsimile apparatus 1 in more detail.

In S25, the data entry section 4 of the facsimile apparatus 1 searches through the memory space for the one-touch dial data in the data managing section 5, and determines the presence or absence of unprocessed data to be entered in the facsimile apparatus 10. If there is no unprocessed data, the sequence goes to S32.

If unprocessed data is found, the sequence goes to S26. In S26, one of the data is selected from the unprocessed data, and the sequence goes to S27. It is determined in S27 whether the memory space for the one-touch dial data in the facsimile apparatus 10 has a vacant space containing no data, for example. If YES in S27, the data selected in S26 is entered in S28 in the vacant space found in S27, and the sequence returns to S25.

On the other hand, if no vacant space is found in S27, it is determined in S29 whether the speed dial memory space in the facsimile apparatus 10 has a vacant space. If YES in S29, the data selected in S26 is entered in S30 in the vacant space found in S29, and the sequence returns to S25. If NO in S29, the data is not entered in S31 (data entry is cancelled), and the sequence goes to S39.

If unprocessed one-touch dial data is not present in S25, it is determined in S32 whether the stored data in the memory space of the data managing section 5 contain unprocessed data. If NO, the sequence goes to S39. If YES, one of the speed dial data is selected in S33, and the sequence goes to S34.

In S34, it is determined whether the one-touch dial memory space in the facsimile apparatus 10 has a vacant space. If YES in S34, the data selected in S33 is entered in S35 in the vacant space found in S34, and the sequence goes to S32.

If NO in S34, it is determined in S36 whether the speed dial memory space in the facsimile apparatus 10 has a vacant space. If YES in S36, the data selected in S33 is entered in S37 in the vacant space found in S36, and the sequence returns to S32. If NO in S36, the data is not entered in S38 (data entry is cancelled), and the sequence goes to S39.

In S39, the result of data entry by the data entry section 4 is outputted for a print job with respect to each data transferred from the facsimile apparatus 1 to the facsimile apparatus 10. The output print data includes, for example, the correspondence between the one-touch dial keys and their destinations, or between the speed dial keys and their destinations, with respect to each transferred data. The print job may be carried out by the print section 7 of the facsimile apparatus 1, or by the print section of the facsimile apparatus 10. By thus printing out the result of data entry, a user is able to easily recognize the result of data transfer.

In the steps S25 through S31, the one-touch dial data of the facsimile apparatus 1 is entered in the memory space of the facsimile apparatus 10 by first determining in S27 the presence or absence of a vacant memory space for the one-touch dial data, and then determining in S29 the presence or absence of a vacant memory space for the speed dial data. In this way, the data can be stored with priority in the one-touch dial memory space of the facsimile apparatus 10.

Similarly, in the steps S32 through S38, the speed dial data of the facsimile apparatus 1 is entered in the memory space of the facsimile apparatus 10 by first determining in S34 the presence or absence of a vacant memory space for the one-touch dial data, and then determining in S36 the presence or absence of a vacant memory space for the speed dial data. In this way, the data can be stored with priority in the one-touch dial memory space of the facsimile apparatus 10.

Note that, as shown in FIG. 9, the data entry may be carried out by determining the presence or absence of a vacant space in the destination apparatus with respect to each data or a group of data.

Third Embodiment

Figure 11:
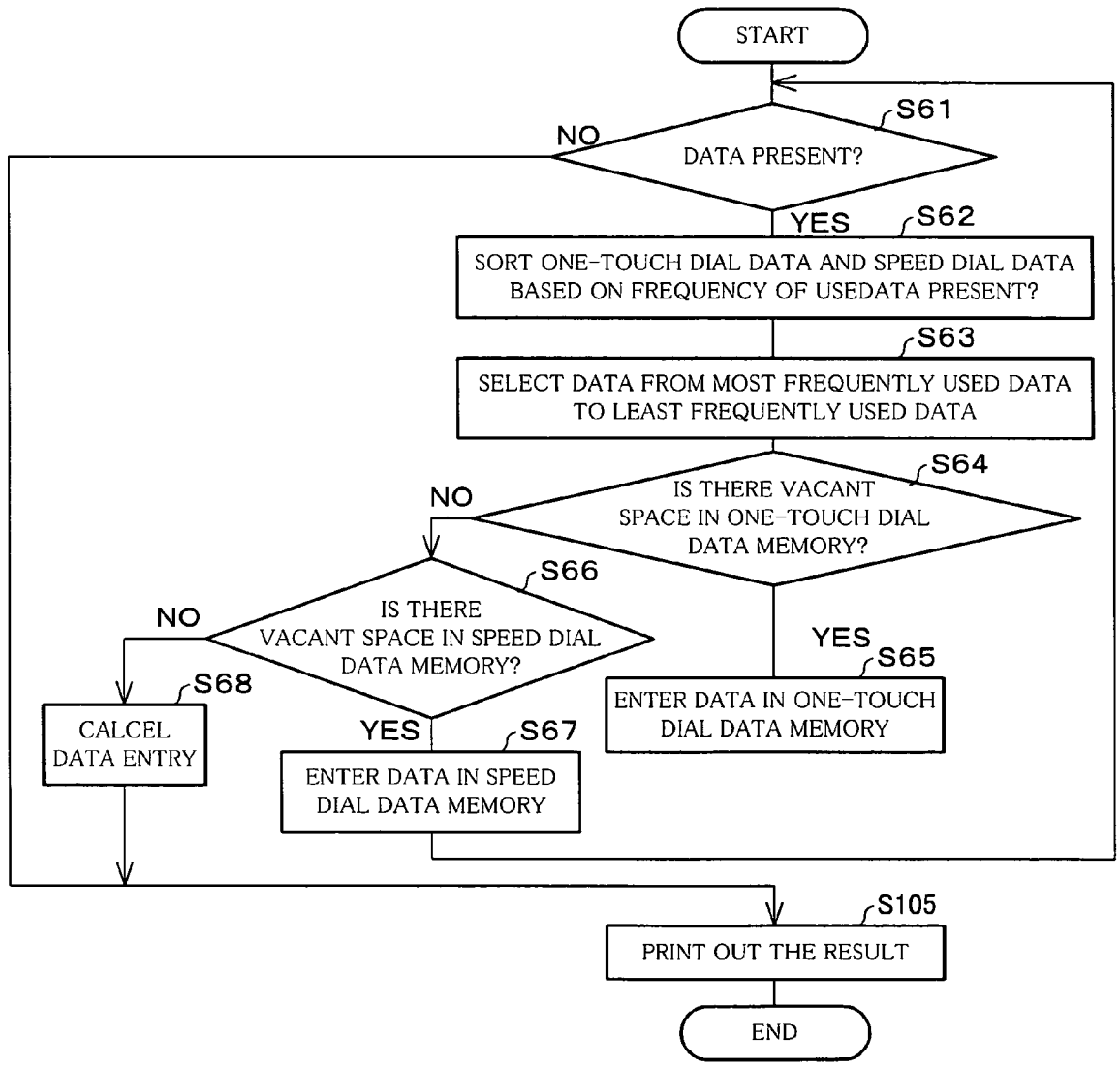
FIG. 11 is a flowchart specifically showing an example of data transfer by the facsimile apparatus.

Referring to FIG. 10 and FIG. 11, the following will describe yet another embodiment of the present invention.

A facsimile apparatus of the present embodiment have substantially the same schematic structure as the facsimile apparatus 1 of the First Embodiment. The present embodiment differs from the First Embodiment in the data transfer process to the facsimile apparatus 10. Accordingly, the facsimile apparatus of the present embodiment will also be described as the facsimile apparatus 1, and the following description only deals with the differences from the First Embodiment.

The facsimile apparatus 1 of the present embodiment is adapted so that the data entry section (frequency measuring section) 4 carries out data entry for the one-touch dial data and speed dial data based on frequency information that is measured with respect to each destination while the facsimile apparatus is in use.

Referring to FIG. 10(*a*) through FIG. 10(*e*), description is made below as to the frequency information for each destination.

FIG. 10(*a*) shows an example of stored data in the facsimile apparatus 1. The data are classified under headings including TYPE, ONE-TOUCH (SPEED) DIAL NUMBER, DESTINATION NAME, DESTINATION NAME IN KANA, PHONE (FAX) NUMBER, AND ATTRIBUTE OF COMMUNICATIONS, as described in the First Embodiment with reference to FIG. 3. In addition, the data are also classified under the heading "FREQUENCY INFORMATION." No further explanation will be given for the headings already described with reference to FIG. 3.

The heading FREQUENCY INFORMATION indicates the number of times the one-touch dial data or speed dial data have been used since these data were entered in, for example, the facsimile apparatus 1. The count is made by the data entry section (frequency measuring section) 4.

For example, as shown in FIG. 10(*c*), when it is found in S44 that a user has carried out data entry for the one-touch dial data or speed dial data, the data entry section 45 in S45 sets an initial value 100 for the frequency information. In this way, the frequency information is initialized. The initial value is not just limited to 100, and any value may be set.

In another example, as shown in FIG. 10(*b*), when it is found in S41 that a user has carried out FAX transmission using the one-touch dial function or speed dial function, the data entry section 4 in S42 adds "1" to the frequency information of the one-touch dial data or speed dial data used. In S43, the value of frequency information set in S42 exceeds a predetermined upper limit value, the current value of frequency information is set to a new upper limit value. In this way, the frequency information is updated.

In another example, as shown in FIG. 10(*d*), the initialized frequency information may be updated regularly, and the value of frequency information may be decreased for unused data. For example, when it is found in S46 that certain days have passed since the last regular update, the data entry section in S47 may subtract "1" from the frequency information of all the data. If the frequency information is 0, a lower limit value "1" is set in S48. The process is finished when certain days have not passed in S46.

Alternatively, the procedure shown for example in FIG. 10(*e*) may be used to enter data in a destination apparatus, using frequency information. Specifically, the stored data in the facsimile apparatus 1 are first sorted in S49 based on the frequency information. In S50, data entry is carried out for the data that has not been entered in the destination apparatus and that with the largest frequency information. In S51, it is determined whether the destination apparatus has a vacant memory space. If YES in S51, the sequence returns to S49. If NO, the procedure is finished. This will be described later in more detail.

Referring to FIG. 11, the following describes an exemplary data transfer process of the facsimile apparatus 1 in more detail.

In S61, the data entry section 4 of the facsimile apparatus 1 searches through the memory spaces for the one-touch dial data and speed dial data in the data managing section 5, and determines the presence or absence of unprocessed data to be entered in the facsimile apparatus 10. If there is no unprocessed data, the sequence goes to S69.

If unprocessed data are found, the one-touch dial data and speed dial data are sorted in S62 based on their frequency of use, and the sequence goes to S63. In S63, data with the largest frequency of use is selected from the data sorted in S62, and the sequence goes to S64.

It is determined in S64 whether the memory space for the one-touch dial data in the facsimile apparatus 10 has a vacant space containing no data, for example. If YES in S64, the data selected in S63 is entered in S65 in the vacant space found in S64, and the sequence returns to S61.

On the other hand, if no vacant space is found in S64, it is determined in S66 whether the speed dial memory space in the facsimile apparatus 10 has a vacant space. If YES in S66, the data selected in S63 is entered in the vacant space found in S66, and the sequence returns to S61. If NO in S66, the data is not entered in S68 (data entry is cancelled), and the sequence goes to S69.

In S69, the result of data entry by the data entry section 4 is outputted for a print job with respect to each data transferred from the facsimile apparatus 1 to the facsimile apparatus 10. The output print data includes, for example, the correspondence between the one-touch dial keys and their destinations, or between the speed dial keys and their destinations, with respect to each transferred data. The print job may be carried out by the print section 7 of the facsimile apparatus 1, or by the print section of the facsimile apparatus 10. By thus printing out the result of data entry, a user can easily recognize the result of data transfer.

In the steps S61 through S68, the one-touch dial data and speed dial data of the facsimile apparatus 1 are entered in the memory space of the facsimile apparatus 10 by first determining in S64 the presence or absence of a vacant memory space for the one-touch dial data, and then determining in S66 the presence or absence of a vacant memory space for the speed dial data. In this way, the data can be stored with priority in the one-touch dial memory space of the facsimile apparatus 10.

Similarly, in the steps S62 through S63, the selected data in the facsimile apparatus 1 are entered in the facsimile apparatus 10 one after another, from the most frequently used data to the least frequently used data. In this way, usability of the one-touch dials and speed dials can be improved in the facsimile apparatus 10.

Note that, as shown in FIG. 11, the data entry may be carried out by determining the presence or absence of a vacant space in the destination apparatus with respect to each data or a group of data.

Fourth Embodiment

Figure 12:
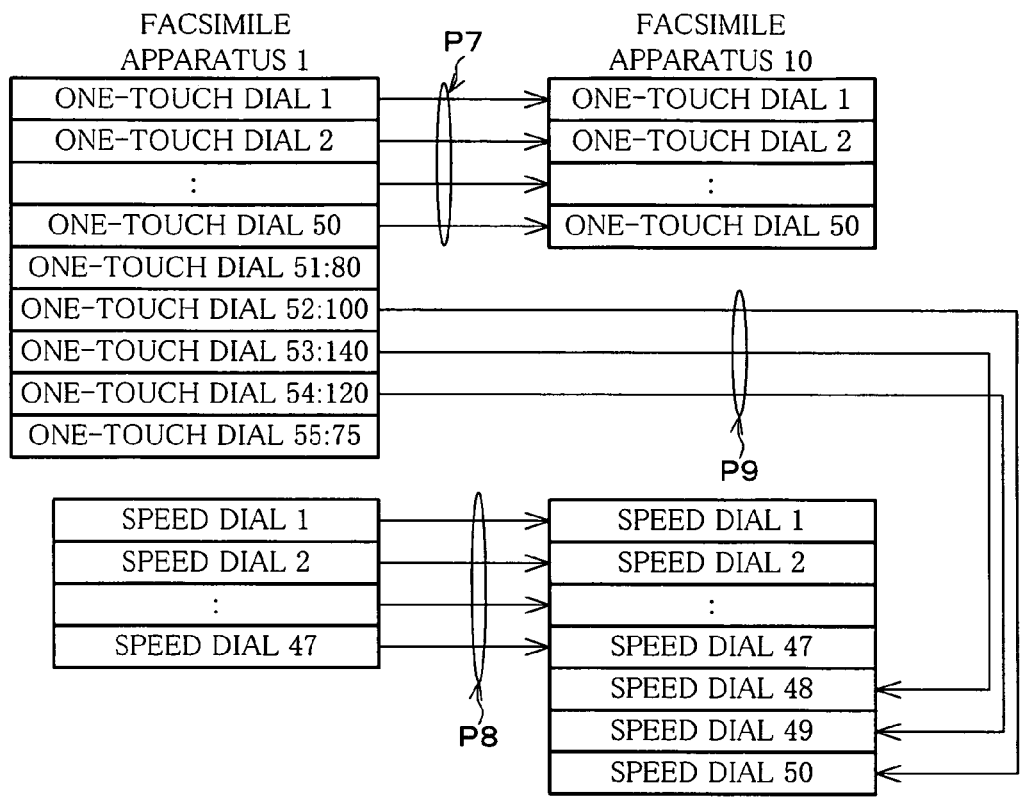
FIG. 12(a) is a view showing an example of data transfer of one-touch dial data and speed dial data according to still another embodiment of the facsimile apparatus of the present invention.
FIG. 12(b) is a view showing another example of data transfer by the facsimile apparatus.
Figure 12:
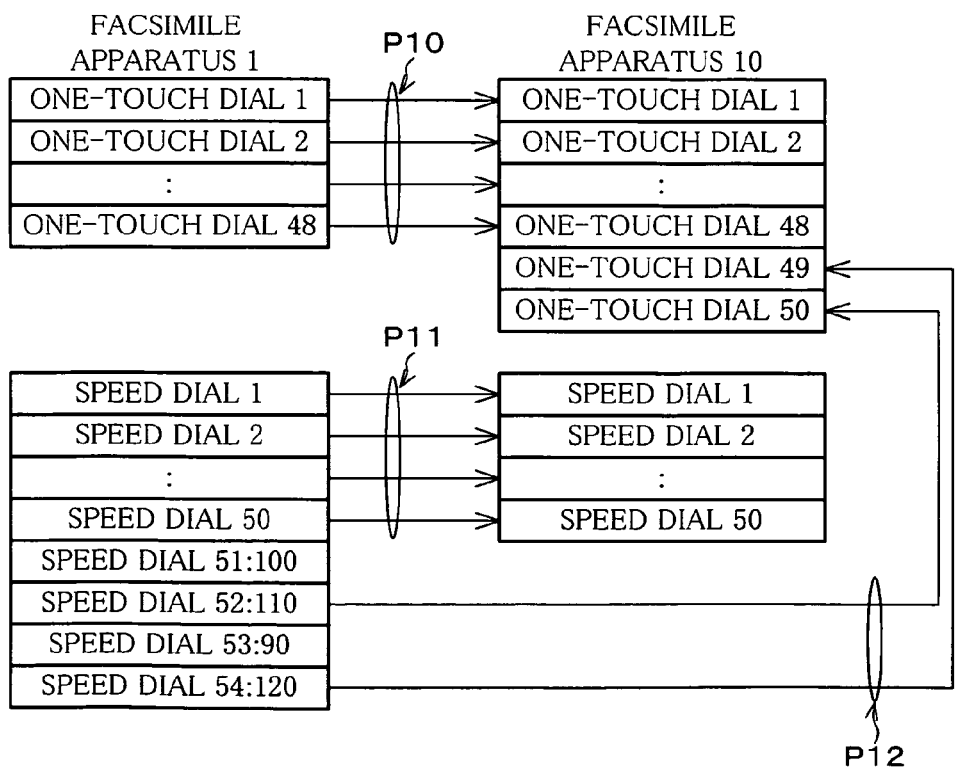
Figure 13:
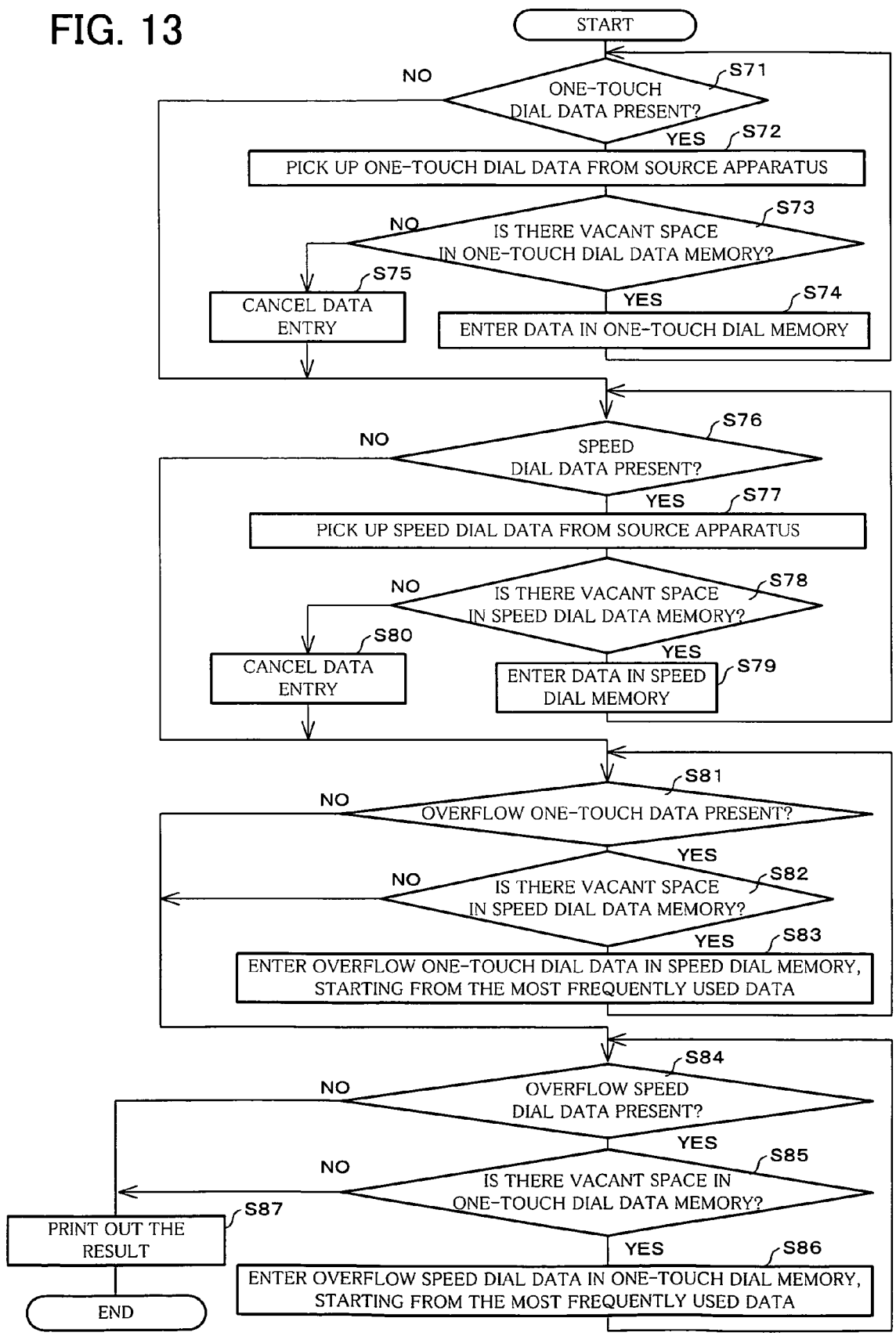
FIG. 13 is a flowchart specifically showing an example of data transfer by the facsimile apparatus.

Referring to FIG. 12 and FIG. 13, the following will describe yet another embodiment of the present invention.

A facsimile apparatus of the present embodiment have substantially the same schematic structure as the facsimile apparatus 1 of the First Embodiment. The present embodiment differs from the First Embodiment in the data transfer process to the facsimile apparatus 10. Accordingly, the facsimile apparatus of the present embodiment will also be described as the facsimile apparatus 1, and the following description only deals with the differences from the First Embodiment.

The facsimile apparatus 1 of the present embodiment is adapted to carry out data entry for the one-touch dial data and speed dial data based on frequency information that is measured with respect to each destination while the facsimile apparatus is in use. In the present embodiment, the data entry based on the frequency information is carried out only for the overflow data.

Referring to FIG. 12(a) and FIG. 12(b), description is made below as to how data transfer is carried out.

In the first example of the present embodiment as shown in FIG. 12(a), the data managing section 5 of the facsimile apparatus 1 is assumed to have 55 entries for the one-touch dial data, and 47 entries for the speed dial data. In FIG. 12(a), "one-touch dial 51:80" indicates one-touch dial data with an ID number 51 and a frequency value 80.

It is also assumed here that the facsimile apparatus 10 can have up to 50 entries for the one-touch dial data, and up to 50 entries for the speed dial data.

With this configuration, the data entry section 4 of the facsimile apparatus 1 detects the respective sizes of the one-touch dial memory and speed dial memory in the facsimile apparatus 10.

The size of one-touch dial data (55 entries) stored in the data managing section 5 of the facsimile apparatus 1 exceeds the size of the one-touch dial memory (50 entries) in the facsimile apparatus 10.

The data entry section 4 of the facsimile apparatus 1 transfers one-touch dial data with ID numbers 1 through 50 (one-touch dials 1 through 50) from the facsimile apparatus 1 to the facsimile apparatus 10, and enters these one-touch dial data as one-touch dials 1 through 50 in the facsimile apparatus 10 (P7).

The size of speed dial data (47 entries) stored in the data managing section 5 of the facsimile apparatus 1 is smaller than the size of the speed dial memory (50 entries) in the facsimile apparatus 10.

The data entry section 4 transfers speed dial data with ID numbers 1 through 47 (speed dials 1 through 47) from the facsimile apparatus 1 to the facsimile apparatus 10, and enters these speed dial data as speed dials 1 through 47 in the facsimile apparatus 10 (P8).

Then, "one-touch dial 53:140," "one-touch dial 54:120," and "one-touch dial 52:100" of descending frequency of use are selected from the unprocessed one-touch dial data with ID numbers 51 through 55 in the facsimile apparatus 1, and the data are transferred and entered as speed dials 48, 49, and 50, respectively.

In this manner, the facsimile apparatus 1 may be adapted to first transfer data to the facsimile apparatus 10 by maintaining the integrity of the data as much as possible (P7, P8), and then select, for example, three one-touch dial data with the top three highest frequency of use from the overflow one-touch dial data when three vacant spaces are found in the speed dial data memory of the facsimile apparatus 10, and finally enter the selected data in the speed dial memory of the facsimile apparatus 10.

In the second example of the present embodiment as shown in FIG. 12(b), the data managing section 5 of the facsimile apparatus 1 is assumed to have 48 entries for the one-touch dial data, and 54 entries for the speed dial data.

It is also assumed here that the facsimile apparatus 10 can have up to 50 entries for the one-touch dial data, and up to 50 entries for the speed dial data.

With this configuration, the data managing section 5 of the facsimile apparatus 1 detects the respective sizes of the one-touch dial memory and speed dial memory in the facsimile apparatus 10.

Here, the size of one-touch dial data (48 entries) stored in the data managing section 5 of the facsimile apparatus 1 is smaller than the size of the one-touch dial memory (50 entries) in the facsimile apparatus 10.

The data entry section 4 of the facsimile apparatus 1 transfers one-touch dial data with ID numbers 1 through 48 (one-touch dials 1 through 48) from the facsimile apparatus 1 to the facsimile apparatus 10, and enters the data as one-touch dials 1 through 48 (P10).

The size of speed dial data (54 entries) stored in the data managing section 5 of the facsimile apparatus 1 exceeds the size of the speed dial memory (50 entries) in the facsimile apparatus 10.

The data entry section 4 transfers speed dial data with ID numbers 1 through 50 (speed dials 1 through 50) to the facsimile apparatus 10, and enters the data as speed dials 1 through 50 (P11).

Then, "speed dial 54:120" and "speed dial 52:110" of descending frequency of use are selected from the unprocessed speed dial data with ID numbers 51 through 54 in the facsimile apparatus 1, and the data are transferred and entered as one-touch dials 49 and 50, respectively.

In this manner, the facsimile apparatus 1 may be adapted to first transfer data to the facsimile apparatus 10 by maintaining the integrity of the data as much as possible (P10, P11), and then select, for example, two speed dial data with the top two highest frequency of use from the overflow speed dial data when two vacant spaces are found in the one-touch dial data memory of the facsimile apparatus 10, and finally enter the selected data in the one-touch dial memory of the facsimile apparatus 10.

Referring to FIG. 13, the following will describe the data transfer of the present embodiment more specifically.

In S71, the data entry section 4 of the facsimile apparatus 1 searches through the memory space for the one-touch dial data in the data managing section 5, and determines the presence or absence of unprocessed data to be entered in the facsimile apparatus 10. If there is no unprocessed data, the sequence goes to S76.

If unprocessed data are found, one of the unprocessed data is selected, and the sequence goes to S73. It is determined in S73 whether the memory space for the one-touch dial data in the facsimile apparatus 10 has a vacant space containing no data for example. If YES in S73, the data selected in S72 is entered in S74 in the vacant space found in S73, and the sequence returns to S71. On the other hand, if no vacant space is found in S73, the data is not entered in S75 (data entry is cancelled), and the sequence goes to S76.

In S76, it is determined whether the stored data in the speed dial data memory of the data managing section 5 contain unprocessed data. If NO, the sequence goes to S81. If YES, one of the speed dial data is selected in S77, and the sequence goes to S78.

In S78, it is determined whether the speed dial memory of the facsimile apparatus 10 (destination apparatus) has a vacant space. If YES in S78, the selected data in S77 is entered in S79 in the vacant space found in S78, and the sequence returns to S79. If NO in S78, the data entry is cancelled in S80, and the sequence goes to S81.

In S81, it is determined whether the one-touch dial memory of the data managing section 5 in the facsimile apparatus 1 contain data to be entered in the memory space of the facsimile apparatus 10 (overflow one-touch dial data). If YES in S82, the sequence goes to S82. If NO, the sequence goes to S84.

In S82, it is determined whether the speed dial memory space of the facsimile apparatus 10 (destination apparatus) has a vacant memory space. If YES in S82, the sequence goes to S83. If NO in S82, the sequence goes to S84.

In S83, the most frequently used data is selected from the overflow one-touch dial data found in S81. The data selected in S83 is entered in the vacant space found in S82, and the sequence returns to S81.

In S84, it is determined whether the speed dial memory of the data managing section 5 in the facsimile apparatus 1 contains data to be entered in the memory space of the facsimile apparatus 10 (overflow speed dial data). If YES in S84, the sequence goes to S85. If NO, the sequence goes to S87.

In S85, it is determined whether the one-touch dial memory in the facsimile apparatus 1 has a vacant space. If YES in S85, the sequence goes to S86. If NO, the sequence goes to S87.

In S86, the most frequently used data is selected from the overflow speed dial data found in S84. The selected data is entered in the vacant space found in S85, and the sequence returns to S84.

In S87, the result of data entry by the data entry section 4 is outputted for a print job with respect to each data transferred from the facsimile apparatus 1 to the facsimile apparatus 10. The output print data includes, for example, the correspondence between the one-touch dial keys and their destinations, or between the speed dial keys and their destinations, with respect to each transferred data. The print job may be carried out by the print section 7 of the facsimile apparatus 1, or by the print section of the facsimile apparatus 10. By thus printing out the result of data entry, a user can easily recognize the result of data transfer.

Note that, as shown in FIG. 13, the data entry may be carried out by determining the presence or absence of a vacant space in the destination apparatus with respect to each data or a group of data.

Fifth Embodiment

Figure 14:
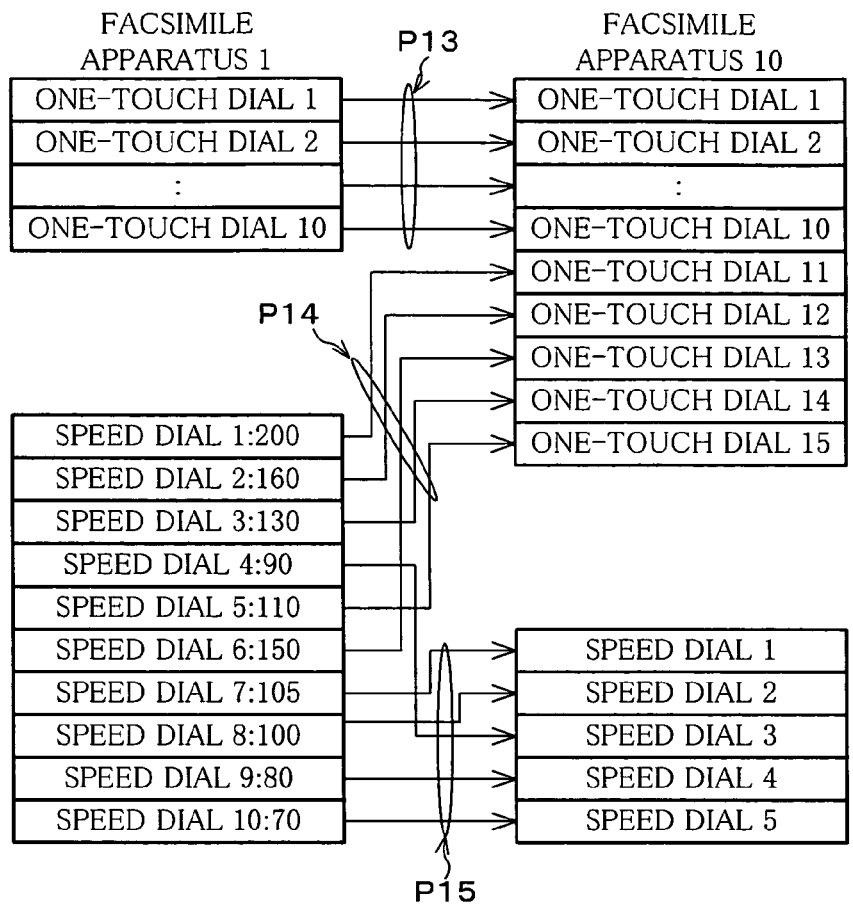
FIG. 14(a) is a view showing an example of data transfer of one-touch dial data and speed dial data according to yet another embodiment of the facsimile apparatus of the present invention.
FIG. 14(b) is a view showing another example of data transfer by the facsimile apparatus.
Figure 14:
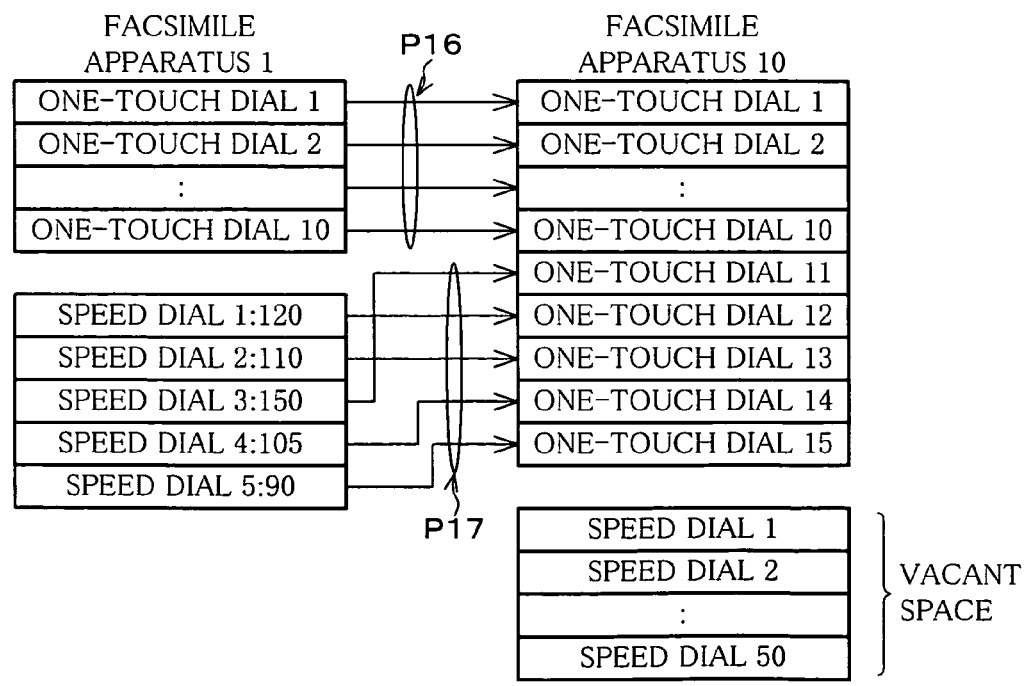
Figure 15:
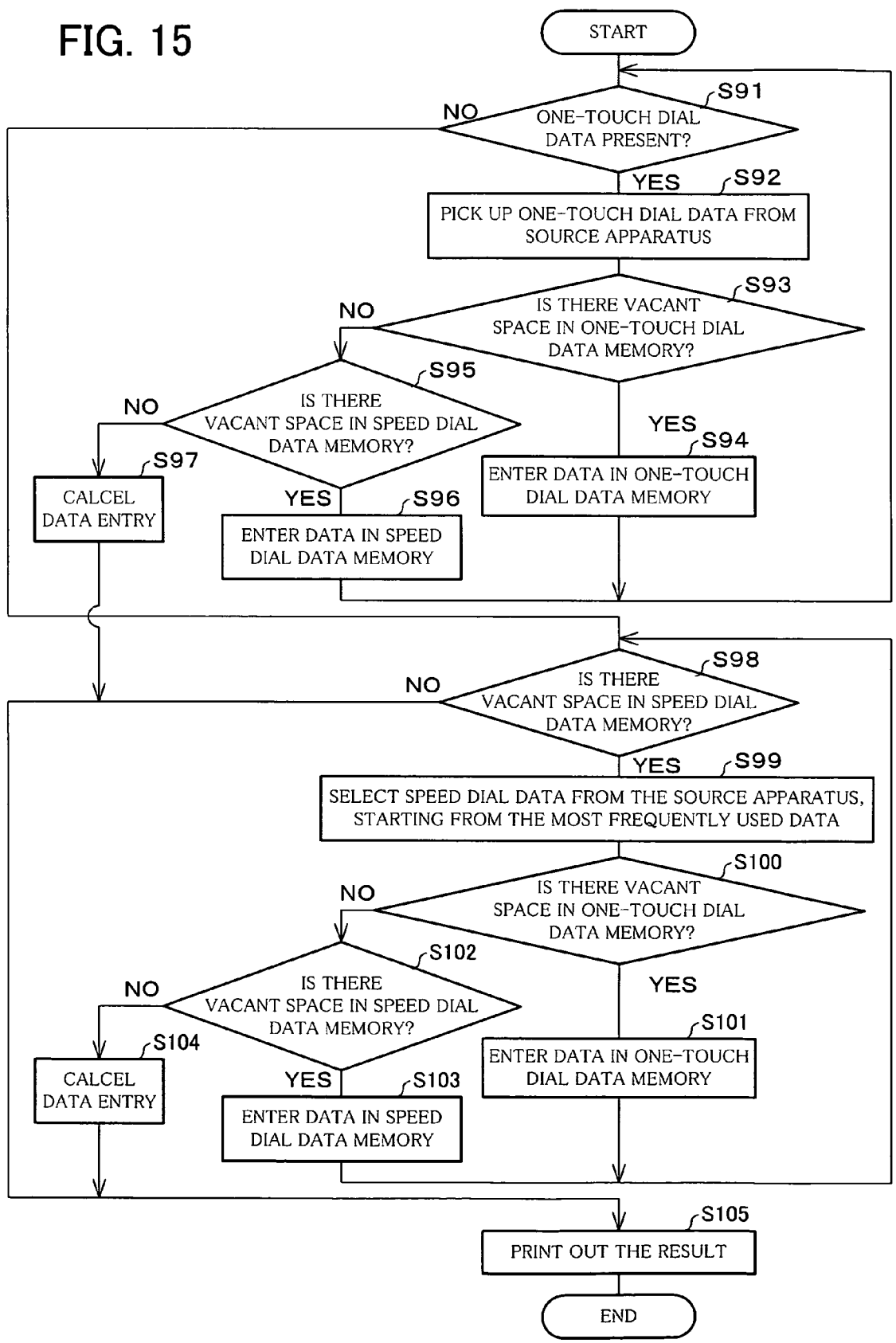
FIG. 15 is a flowchart specifically showing data transfer by the facsimile apparatus.

Referring to FIG. 14 and FIG. 15, the following will describe yet another embodiment of the present invention.

A facsimile apparatus of the present embodiment have substantially the same schematic structure as the facsimile apparatus 1 of the First Embodiment. The present embodiment differs from the First Embodiment in the data transfer process to the facsimile apparatus 10. Accordingly, the facsimile apparatus of the present embodiment will also be described as the facsimile apparatus 1, and the following description only deals with the differences from the First Embodiment.

The facsimile apparatus 1 of the present embodiment is adapted to carry out data entry for the one-touch dial data and speed dial data based on frequency information that is measured with respect to each destination while the facsimile apparatus is in use. In the present embodiment, the one-touch dial data is prioritized in the data entry that is carried out according to the frequency of use.

Referring to FIG. 14(a) and FIG. 14(b), the following briefly describes how data transfer is carried out.

In the first example of the present embodiment as shown in FIG. 14(a), the data managing section 5 of the facsimile apparatus 1 is assumed to have 10 entries for the one-touch dial data, and 10 entries for the speed dial data.

It is also assumed here that the facsimile apparatus 10 can have up to 15 entries for the one-touch dial data, and up to 5 entries for the speed dial data.

With this configuration, the data entry section 4 of the facsimile apparatus 1 detects the respective sizes of the one-touch dial memory and speed dial memory in the facsimile apparatus 10.

The size of one-touch dial data (10 entries) stored in the data managing section 5 of the facsimile apparatus 1 is smaller than the size of the one-touch dial memory (15 entries) in the facsimile apparatus 10.

The data entry section 4 of the facsimile apparatus 1 transfers one-touch dial data with ID numbers 1 through 10 (one-touch dials 1 through 10) from the facsimile apparatus 1 to the facsimile apparatus 10, and enters these one-touch dial data as one-touch dials 1 through 10 in the facsimile apparatus 10 (P13).

Then, for entry into the vacant one-touch dials 11 through 15 in the one-touch dial memory of the facsimile apparatus 10, speed dial data are selected from the facsimile apparatus 1, starting from the most frequently used data. The speed dial data so selected, "speed dial 1:200," "speed dial 2:160," "speed dial 6:150," "speed dial 3:130," and "speed dial 5:110," are transferred and entered as one-touch dials 11 through 15, respectively (P14).

Similarly, for entry into the vacant speed dials 1 through 5 in the speed dial memory space of the facsimile apparatus 10, speed dial data are selected from the remaining data in the facsimile apparatus 1, starting from the most frequently used data. The speed dial data so selected, "speed dial 7:105," "speed dial 8:100," "speed dial 4:90," "speed dial 9:80," and "speed dial 10:70," are transferred and entered as speed dials 1 through 5, respectively (P15).

In this manner, the facsimile apparatus 1 may be adapted to first transfer data to the facsimile apparatus 10 by maintaining the integrity of the one-touch dial data as much as possible (P13), and then enter data in the vacant one-touch dial memory space and the vacant speed dial memory space of the facsimile apparatus 10, starting from the most frequently used data.

In the second example of the present embodiment as shown in FIG. 14(b), the data managing section 5 of the facsimile apparatus 1 is assumed to have 10 entries for the one-touch dial data, and 5 entries for the speed dial data.

It is also assumed here that the facsimile apparatus 10 can have up to 15 entries for the one-touch dial, and up to 50 entries for the speed dial data.

With this configuration, the data entry section 4 of the facsimile apparatus 1 detects the respective sizes of the one-touch dial memory and speed dial memory in the facsimile apparatus 10.

Here, the size of one-touch dial data (10 entries) stored in the data managing section 5 of the facsimile apparatus 1 is smaller than the size of the one-touch dial memory (15 entries) in the facsimile apparatus 10.

The data entry section 4 of the facsimile apparatus 1 transfers one-touch dial data with ID numbers 1 through 10 (one-touch dials 1 through 10) from the facsimile apparatus 1 to the facsimile apparatus 10, and enters the data as one-touch dials 1 through 10 (P16).

Then, for entry into the vacant one-touch dials 11 through 15 in the one-touch dial memory space of the facsimile apparatus 10, speed dial data are selected from the facsimile apparatus 1, starting from the most frequently used data. The speed dial data so selected, "speed dial 3:150," "speed dial 1:120," "speed dial 2:110," "speed dial 4:105," and "speed dial 5:90," are transferred and entered as one-touch dials 11 through 15, respectively (P17).

In this case, the speed dial memory (speed dials 1 through 50) of the facsimile apparatus 10 remains empty.

In this manner, the facsimile apparatus 1 may be adapted to first transfer data to the facsimile apparatus 10 by maintaining the integrity of the one-touch dial data as much as possible (P16), and then enter data in the vacant one-touch dial memory space and the vacant speed dial memory space of the facsimile apparatus 10, starting from the most frequently used data.

Referring to FIG. 15, the following will describe exemplary data transfer of the present embodiment in detail.

In S91, the data entry section 4 of the facsimile apparatus 1 searches through the memory space for the one-touch dial data in the data managing section 5, and determines the presence or absence of unprocessed data to be entered in the facsimile apparatus 10. If there is no unprocessed data, the sequence goes to S98.

If unprocessed data are found, one of the unprocessed data is selected, and the sequence goes to S93. It is determined in S93 whether the memory space for the one-touch dial data in the facsimile apparatus 10 has a vacant space containing no data, for example. If YES in S93, the data selected in S92 is entered in S94 in the vacant space found in S93, and the sequence returns to S91.

On the other hand, if no vacant space is found in S93, it is determined in S95 whether the speed dial memory of the facsimile apparatus 10 has a vacant space. If YES in S95, the selected data in S92 is entered in S96 in the vacant space found in S95, and the sequence returns to S91.

If NO in S95, the data is not entered in S97 (data entry is cancelled), and the sequence goes to S105.

In S98, it is determined whether the stored data in the speed dial data memory space of the data managing section 5 contain unprocessed data. If NO, the sequence goes to S105. If YES, the most frequently used data is selected from the unprocessed speed dial data, and the sequence goes to S100.

In S100, it is determined whether the speed dial memory space of the facsimile apparatus 10 (destination apparatus) has a vacant space. If YES in S100, the selected data in S99 is entered in S101 in the vacant space found in S100, and the sequence returns to S98.

If NO in S100, it is determined in S102 whether the speed dial memory of the facsimile apparatus 10 (destination apparatus) has a vacant space. If YES, the selected data in S99 is entered in S103 in the vacant space found in S102, and the sequence returns to S98.

If no vacant space is found in S102, the data entry is cancelled in S104, and the sequence goes to S105.

In S105, the result of data entry by the data entry section 4 is outputted for a print job with respect to each data transferred from the facsimile apparatus 1 to the facsimile apparatus 10. The output print data includes, for example, the correspondence between the one-touch dial keys and their destinations, or between the speed dial keys and their destinations, with respect to each transferred data. The print job may be carried out by the print section 7 of the facsimile apparatus 1, or by the print section of the facsimile apparatus 10. By thus printing out the result of data entry, a user can easily recognize the result of data transfer.

Note that, as shown in FIG. 15, the data entry may be carried out by determining the presence or absence of a vacant space in the destination apparatus with respect to each data or a group of data.

Sixth Embodiment

The following will describe a still another embodiment of the present invention with reference to FIG. 16 through FIG. 19.

A facsimile apparatus E of the present embodiment has substantially the same schematic structure as the facsimile apparatus 1 of the First Embodiment. Facsimile apparatuses F and G of the present embodiment have substantially the same schematic structure as the facsimile apparatus 10 of the First Embodiment.

In the following, description is made as to data transfer from the facsimile apparatus E to the facsimile apparatus F, and from the facsimile apparatus E to the facsimile apparatus G. The description will be made particularly in regard to the differences from the data transfer from the facsimile apparatus 1 to the facsimile apparatus 10.

In the facsimile apparatuses E, F, and G, the operation/display section 3 serves as a group dial section when group dial numbers are selected. The group dial section carries out multicast transmission to a plurality of predetermined destinations as selected by a user. In group dialing, a one-touch dial number, a speed dial number, or a facsimile number is assigned to a predetermined number, so that a user can send faxes to multiple destinations at once (simultaneous transmission, multicast transmission).

The facsimile apparatus E is equipped with a group dial function. The facsimile apparatus E is adapted to enter group dial data (group data) in a destination apparatus by suitably modifying the group dial data according to how the one-touch dial data and speed dial data were entered in the destination apparatus.

Referring to FIG. 16(a) through FIG. 16(c), and FIG. 17(a) through FIG. 17(c), the following briefly describes exemplary data transfer of the present embodiment.

As noted above, the facsimile apparatus E has substantially the same structure as the facsimile apparatus 1 shown in FIG. 2. Accordingly, the facsimile apparatus E will be described as the facsimile apparatus 1. In addition to the speed dial data and one-touch dial data in the structure of the facsimile apparatus 1, the facsimile apparatus E stores group dial data in the data managing section 5. Specifically, the facsimile apparatus E includes a first group dial memory for storing group dial data.

For example, the facsimile apparatus E stores group dial data as shown in FIG. 16(a). In this example, only two kinds of group dial data, Group 1 and Group 2, are shown. However, the present invention is not just limited to this example. Further, in the example of FIG. 16(a), Group 1 and Group 2 each have four destinations. However, the number of destinations is not just limited to 4.

As shown in FIG. 16(a), Group 1 and Group 2 include group dial destination data that are assigned by one-touch dial numbers, speed dial numbers, and facsimile numbers. Group dialing thus enables a user to enter destinations using one-touch dial numbers, speed dial numbers, and facsimile numbers.

As shown in FIG. 16(b), the facsimile apparatus E stores one-touch dial data as indicated by one-touch dials 1 through 35. The data of one-touch dials 1 through 10, 11 through 20, and 21 through 35 are indicated by Ed1, Ed2, and Ed3, respectively.

As shown in FIG. 16(c), the facsimile apparatus E stores speed dial data as indicated by speed dials 1 through 20. The data of speed dials 1 through 15, and 16 through 20 are indicated by Ed4 and Ed5, respectively.

In sum, the facsimile apparatus E has 35 entries for the one-touch dial data, and 20 entries for the speed dial data.

The facsimile apparatus F has substantially the same structure as the facsimile apparatus 10. Accordingly, the facsimile apparatus F will be described as the facsimile apparatus 10. Like the facsimile apparatus E, the facsimile apparatus F stores group dial data in the data managing section. Specifically, the facsimile apparatus F includes a second group dial memory for storing group dial data.

It is assumed here that the facsimile apparatus F can have up to 10 entries for the one-touch dial data, and up to 30 entries for the speed dial data. The following describes how data are transferred from the facsimile apparatus E and entered in the facsimile apparatus F with the described configuration.

As described herein, the one-touch dial data and speed dial data are transferred and entered in a different facsimile apparatus by maintaining the integrity of the stored data as much as possible, and the data are processed in a special way when the data cannot be entered directly. That is, the data are transferred and entered in basically the same manner as in the First Embodiment.

With the data Ed1 of the facsimile apparatus E transferred, the facsimile apparatus F has one-touch dial data as indicated by Fd1, as shown in FIG. 17(b).

The transferred data Ed4 and Ed5 of the facsimile apparatus F are stored as speed dial data in the facsimile apparatus F, as indicated by Fd2 in FIG. 17(c). The transferred data Ed2 of the facsimile apparatus E are stored as speed dial data in the facsimile apparatus F, as indicated by Fd3 in FIG. 17(c).

As described, in the present embodiment, the number of one-touch dial data stored in the facsimile apparatus E is greater than the number of one-touch dial data that can be entered in the facsimile apparatus F, and the number of speed dial data stored in the facsimile apparatus E is smaller than the number of speed dial data that can be entered in the facsimile apparatus F. Accordingly, as with the data transfer described in the First Embodiment, the speed dial data are first transferred from the facsimile apparatus E to the facsimile apparatus F, and then the one-touch dial data are entered in the one-touch dial memory as much as possible, while the remaining one-touch dial data are entered in the speed dial memory.

After the one-touch dial data and speed dial data are transferred, the facsimile apparatus E transfers the group-dial data to the facsimile apparatus F.

As shown in FIG. 16(a), Group (group dial number) 1 of the group dial data in the facsimile apparatus E contains data of one-touch dial number 20.

The data of one-touch dial number 20, transferred from the facsimile apparatus E to the facsimile apparatus F, is entered as a speed dial number 30 in the facsimile apparatus F.

With this change from one-touch dial number 20 to speed dial number 30, the facsimile apparatus E enters the speed dial number 30 in Group 1 by modifying the contents of the group dial data, as shown in FIG. 17(a).

As shown in FIG. 16(a), Group 2 of the group dial data in the facsimile apparatus E contains data of one-touch dial number 35.

Note here that the data of one-touch dial number 35 was not transferred from the facsimile apparatus E to the facsimile apparatus F, and was not entered in the facsimile apparatus F.

Since the data of one-touch dial number 35 assigned to a facsimile number XXX-3535 was not entered, the facsimile apparatus E enters the facsimile number XXX-3535 in Group 2 by modifying the contents of the group dial data, as shown in FIG. 17(a).

By thus transferring the group dial data from the facsimile apparatus E to the facsimile apparatus F, no resetting of data will be necessary.

Referring to FIG. 16(a) through FIG. 16(c), and FIG. 18(a) and FIG. 18(b), the following briefly describes another example of data transfer in the present embodiment.

As noted above, the facsimile apparatus G has substantially the same structure as the facsimile apparatus 10. Accordingly, the facsimile apparatus G will be described as the facsimile apparatus 10. Like the facsimile apparatus E, the facsimile apparatus G stores group dial data in the data managing section. Specifically, the facsimile apparatus G includes a second group dial memory for storing group dial data.

It is assumed here that the facsimile apparatus G can have up to 50 entries for the one-touch dial data as shown in FIG. 18(b), and 0 entries for the speed dial data. In the following, description is made as to how data are transferred from the facsimile apparatus E to the facsimile apparatus G, and entered in the facsimile apparatus G.

With the transferred data Ed1 through Ed3 of the facsimile apparatus E, the facsimile apparatus G stores one-touch dial data as indicated by Gd1. The data Ed4 of the facsimile apparatus E is transferred and stored as one-touch dial data, as indicated by Gd2.

As described, in the present embodiment, the number of one-touch dial data stored in the facsimile apparatus E is smaller than the number of one-touch dial data that can be entered in the facsimile apparatus G, and the number of speed dial data stored in the facsimile apparatus E is greater than the number of speed dial data that can be entered in the facsimile apparatus G. Accordingly, as with the data transfer described in the First Embodiment, the one-touch dial data are first transferred from the facsimile apparatus E to the facsimile apparatus G, and then the speed dial data are entered in the remaining space of the one-touch dial memory.

After the one-touch dial data and speed dial data have been transferred, the facsimile apparatus E transfers the group-dial data to the facsimile apparatus G.

As shown in FIG. 16(a), Group 1 of the group dial data in the facsimile apparatus E contains data of speed dial number 1.

The data of speed dial number 1, transferred from the facsimile apparatus E to the facsimile apparatus G, is entered as a one-touch dial number 36 in the facsimile apparatus G.

With this change from speed dial number 1 to one-touch dial number 36, the facsimile apparatus E enters the one-touch dial number 36 in Group 1 by modifying the contents of the group dial, as shown in FIG. 18(a).

As shown in FIG. 16(a), Group 2 of the group dial data in the facsimile apparatus E contains data of speed dial number 19.

Note here that the data of speed dial number 19 was not transferred from the facsimile apparatus E to the facsimile apparatus G, and was not entered in the facsimile apparatus G.

Since the data of speed dial number 19 assigned to a facsimile number XXX-1919 was not entered, the facsimile apparatus E enters the facsimile number XXX-1919 in Group 2 by modifying the contents of the group dial data, as shown in FIG. 17(a).

By thus transferring the group dial data from the facsimile apparatus E to the facsimile apparatus G, no resetting of data will be required.

Figure 19:
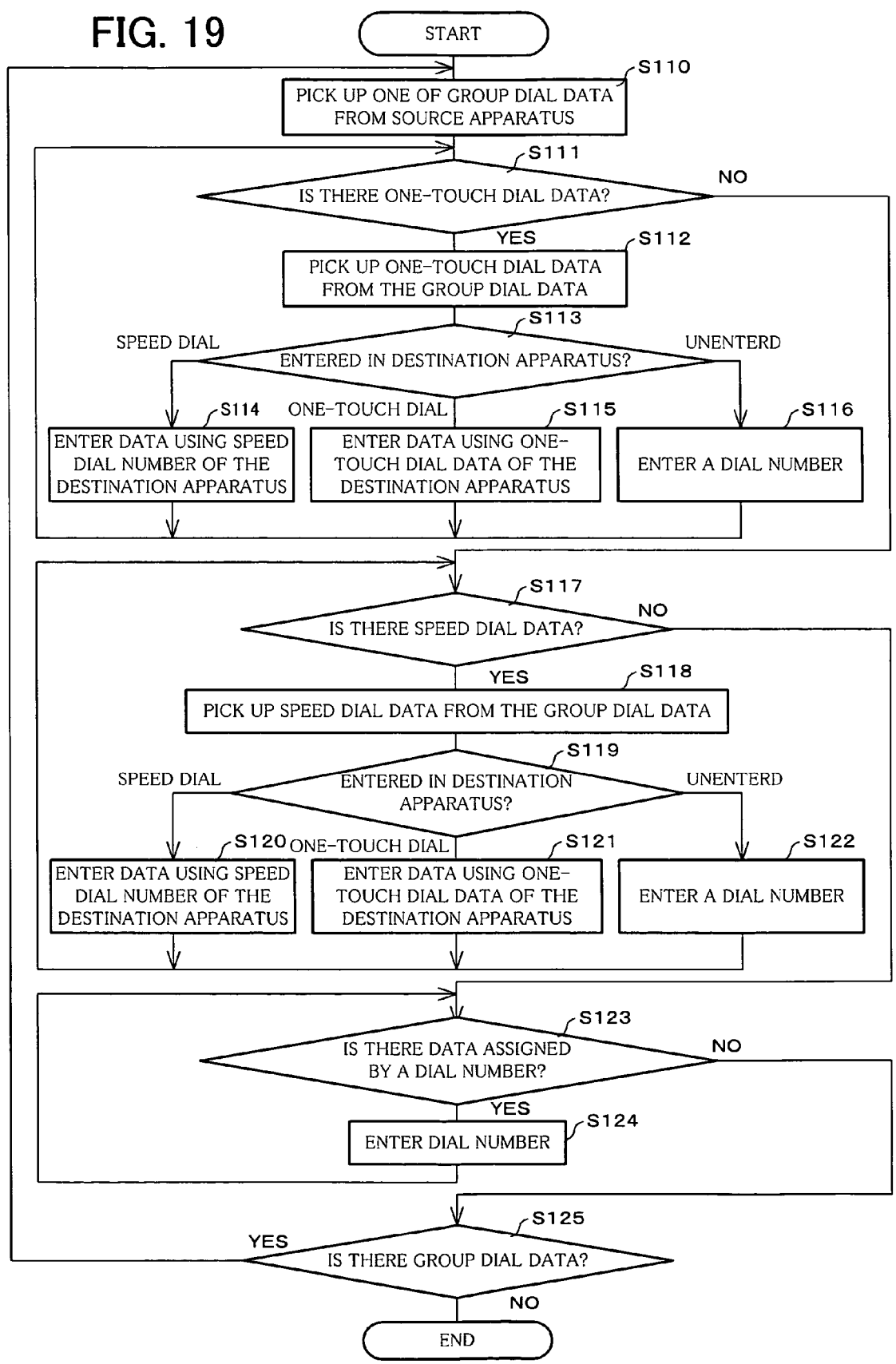
FIG. 19 is a flowchart specifically showing an example of data transfer by the facsimile apparatus storing the data of FIG. 16(a) through FIG. 16(c).

Referring to FIG. 19, the following more specifically describes the transfer of group data in the present embodiment.

The transfer of group dial data described here corresponds to the transfer of group data from the facsimile apparatus E to the facsimile apparatus F, or from the facsimile apparatus E to the facsimile apparatus G, as described above with reference to FIG. 16 through FIG. 18.

It is assumed here that the transfer of one-touch dial data and speed dial data from the facsimile apparatus E to the facsimile apparatus F has been finished. The order of transferring the one-touch dial data and speed dial data is not particularly limited, as described above. For example, the one-touch dial data and speed dial data may be transferred by the procedure described in any of the foregoing embodiments, or by any other procedures.

For the transfer of group dial data, the facsimile apparatus E in S110 picks up one of the group dial data stored therein (source apparatus).

In S111, it is determined whether the group dial data contain data that is assigned by a one-touch dial number. If YES, the sequence goes to S112 and the data is picked up. If NO, the sequence goes to S117.

In S113, it is determined how the assigned data of the one-touch dial number is entered in the destination apparatus.

If it is found in S113 that the data is entered as speed dial data in the destination apparatus, the group dial data to be entered in the destination apparatus is modified in S114 using the speed dial number of the destination apparatus, before the group dial data is entered in the destination apparatus.

On the other hand, if it is found in S113 that the data is entered as one-touch dial data in the destination apparatus, the group dial data to be entered in the destination apparatus is entered in the destination apparatus using the one-touch dial number of the destination apparatus. Here, the reason the one-touch dial number of the destination apparatus is used is that the one-touch dial number itself may have been changed.

If it is found in S113 that the data is neither one-touch dial data or speed dial data, and was not entered in the destination apparatus, the group dial data is entered in the destination apparatus in S116 using the facsimile number assigned to the data.

After the steps S114, S115, and S116, the sequence returns to S111 and the presence or absence of (unprocessed) one-touch dial data is determined. Through the process of S111 through S116, the assigned data of the one-touch dial data in the group dial data of the source apparatus can be properly entered as the group dial data of the destination apparatus.

In S117, it is determined whether the group dial data contain data that is assigned by a speed dial number. If YES, the sequence goes to S118 and the data is picked up. If NO, the sequence goes to S123.

In S119, it is determined how the assigned data of the speed dial number is entered in the destination apparatus.

If it is found in S119 that the data is entered as speed dial data in the destination apparatus, the group dial data is entered in S120 using the speed dial number of the destination apparatus. Here, the reason the speed dial number of the destination apparatus is used is that the speed dial number itself may have been changed.

On the other hand, if it is found in S119 that the data is entered as one-touch dial data in the destination apparatus, the group dial data is entered in the destination apparatus in S121, using the one-touch dial number of the destination apparatus.

If it is found in S119 that the data is neither one-touch dial data or speed dial data, and was not entered in the destination apparatus, the group dial data is entered in the destination apparatus in S122, using the facsimile number of the data.

After the steps S120, S121, and S122, the sequence returns to S117 and the presence or absence of (unprocessed) speed dial data is determined. Through the steps S117 through S122, the assigned data of the speed dial number in the group dial data of the source apparatus can be properly entered as the group dial data of the destination apparatus.

In S123, it is determined whether the group dial data contain data assigned by a number, i.e., a facsimile number. If YES, the data is entered in S124 in the destination apparatus using the facsimile number assigned thereto, and the sequence returns to S123. If NO in S123, the sequence goes to S125.

In S125, the presence or absence of unprocessed data is found in the group dial data of the source apparatus. If YES, the sequence returns to S110 and the procedure is repeated. If NO, the procedure is finished.

In sum, group dial data is first picked up in S110. The state of data entry for the group dial data is changed in S111 through S116 according to how the one-touch dial data of the group dial data was transferred. In S117 through S122, the state of data entry for the group dial data is changed according to how the speed dial data of the group dial data was transferred. In S123 and S124, the data with an assigned facsimile number is directly entered in the destination apparatus. In S125, the presence or absence of other group dial data is determined, so as to transfer all group dial data.

In this way, the group dial data can be entered in a different facsimile apparatus (facsimile apparatus F). As a result, no resetting of the group dial data will be necessary.

As described in this embodiment, the one-touch dial data and speed dial data are transferred to a different facsimile apparatus in the manner described in the First Embodiment. However, the present invention is not just limited thereto, and the one-touch dial data and speed dial data may be transferred in any other way.

Further, in the description of the present embodiment pertaining to the steps S114 through S116, S120 through S122, and S124, the data is entered every time it is transferred. However, the present invention is not just limited to this example, and the steps S114 through S116, S120 through S122, and S124 may be carried out to only modify the dial numbers in the source apparatus, and the modified data are entered in the destination apparatus at once in the last step (after S125).

Further, in the described embodiment, the data contained in the group dial data in the source apparatus are all entered in the destination apparatus, using dial numbers for example. However, the present invention is not just limited to this example.

In an alternative example, the facsimile apparatus E may stop entry of group dial data when some of the group dial data cannot be entered in the facsimile apparatus F (destination apparatus).

More specifically, the facsimile apparatus E may stop entry of group dial data in the facsimile apparatus when, for example, the facsimile apparatus F, having stored a large volume of dial data, cannot store any more group dial data due to a shortage of a memory space for the group dial data. For example, an additional step of determining the presence or absence of unentered group dial data may be provided after S125 in FIG. 19.

In this case, the group dial data are not entered when some of the group dial data are missing. This prevents a user from using group dial data containing missing data only to find that facsimile transmission cannot be made to some of the destinations, for example.

The facsimile apparatus E may print out the group dial data using the print section 7. For example, when entry of group dial data is stopped as above, printing the group dial data using the print section 7 ensures that the user knows some of the data are missing in the group dial data.

As described in this embodiment, the group dial data are transferred after the one-touch dial data and speed dial data have been transferred. However, the present invention is not just limited to such an example.

For example, the one-touch dial data and speed dial data may be transferred by maintaining the integrity of the group dial data as much as possible.

In this case, for example, group dial data is first picked up from the source apparatus, and then data assigned by a one-touch dial number or speed dial number in the group dial data is entered in the one-touch dial memory or speed dial memory of the destination apparatus. Thereafter, the remaining data are entered in the one-touch dial memory or speed dial memory of the destination apparatus by the procedures described in the First through Fifth Embodiments. In this way, overflow group dial data can be reduced or eliminated altogether. In addition, usability of group dials is ensured also in the destination apparatus.

For an illustrative purpose, FIG. 8(d) through FIG. 8(f) show alternative forms of the described embodiments.

FIG. 8(d) shows data exchange between an apparatus (equivalent to model A, and accordingly will be referred to as model A) and an apparatus (equivalent to model C, and accordingly will be referred to as model C). For example, data transfer from model A to model C is carried out by transferring the one-touch dial data (one touch dials 1 through 20), indicated by Ad10, to one-touch dials 1 through 20, indicated by Cd4, and by transferring the speed dial data (speed dials 1 through 100), indicated by Ad12, to speed dials 1 through 100, indicated by Cd5. Here, the data Ad11 (one-touch dials 21 through 50) and the data Ad13 (speed dials 101 through 300) are overflow one-touch dial data and overflow speed dial data, respectively. Conversely, the data transfer from model C to model A is carried out by transferring the data Cd4 to Ad10, and the data Cd5 to Ad12.

In another data transfer from model A to model C in the facsimile apparatus of the present invention, as shown in FIG. 8(e), the one-touch dial data (one-touch dials 1 through 20), indicated by Ad14, are entered as speed dials 1 through 30, indicated by Cd7, for example. The one-touch dial data (one-touch dials 21 through 50), indicated by Ad15, are entered as speed dials 1 through 30, indicated by Cd7. Thereafter, some of the overflow speed dial data (speed dials 1 through 300), indicated by Ad16, are entered as speed dials 31 through 100, for example, in the order of their frequency of use.

In another data transfer from model C to model A in the facsimile apparatus of the present invention, as shown in FIG. 8(f), the one-touch dial data (one-touch dials 1 through 20), indicated by Cd9, are entered as one-touch dials 1 through 20, indicated by Ad17, for example. The data Cd10 (speed dials 1 through 30) and the data Cd11 (speed dials 31 through 100) are entered as Ad18 (one-touch dials 21 through 50) and Ad19 (speed dials 1 through 70), respectively. Ad20 (speed dials 71 through 300) contains no data.

Conventional facsimile apparatuses neglected the problem of dropped data that might occur when copying the one-touch dial data or speed dial data to a newly purchased facsimile apparatus, for example. Further, conventional facsimile apparatuses did not recognize copying the data by maintaining the integrity of the data as much as possible.

In fact, conventional facsimile apparatuses did not even consider the data transfer as described in the present invention, because the data structure of the conventional facsimile apparatus for the speed dial data and one-touch dial data varied from model to model. Examples of such data structures include the order of data, and availability of kana characters and Chinese characters.

Thus, the conventional facsimile apparatuses caused a problem when, for example, a newly purchased facsimile apparatus did not have enough memory space for the data to be entered. Namely, some of the transferred speed dial data or one-touch dial data were not entered in the facsimile apparatus. In this case, a user is often required to re-enter the overflow data.

Another problem may be caused when using group dialing in the conventional facsimile apparatuses. Namely, in using group dials that are set by speed dial numbers or one-touch dial numbers, data may overflow and a one-touch dial number may not be entered properly when the when the number of maximum entries is different between the facsimile apparatuses, for example. In this case, a user may be required to re-enter the overflow data.

The present invention provides a solution to these problems by re-entering as much overflow one-touch dial data as possible in the speed dial memory, and as much speed dial data as possible in the one-touch dial memory, thereby assisting the user's data entry. When re-entering data, the data may be entered in the order of the frequency the data are used, so that usability can be improved. When using group dialing, the group dial data are suitably modified when the speed dial data or one-touch dial data are re-entered. In the described embodiments, the data are transferred by the source apparatus. However, the present invention is not just limited to this example. For example, the data transfer may be carried out by the destination apparatus, or a host apparatus connecting the source apparatus and destination apparatus.

It should be noted that the phone numbers in the attached drawings are merely used for the purpose of explanation, and they do not restrict the present invention in any ways.

In order to solve the foregoing problems, a facsimile apparatus according to the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; and a second memory for storing data used by the speed dial section, wherein the facsimile apparatus further includes: a detecting section for finding a vacant memory space in a third memory and a fourth memory of another facsimile apparatus connected to the facsimile apparatus, the third memory storing data used by a one-touch dial section provided in the another facsimile apparatus, the fourth memory storing data used by a speed dial section provided in the another facsimile apparatus; and an entry section for entering data of the first memory in the third memory, and data of the second memory in the fourth memory, the entry section entering at least some of the data stored in the first memory in the fourth memory when the detecting section finds that an amount of data stored in the first memory exceeds a vacant memory space in the third memory, and that an amount of data stored in the second memory is smaller than a vacant memory space in the fourth memory.

With this configuration, when a combination of two or three numeric keys is selected for example, the speed dial section of the facsimile apparatus reads out assigned data of the selected numeric keys from the second memory, and sends the data to a destination apparatus assigned by the combination of numeric keys. The second memory stores data to be used by the speed dial section (speed dial data) in the destination apparatus. The function of the speed dial section may be realized by using a designated key and a combination of numeric keys.

When one of the keys independently provided from the numeric keys is selected, the one-touch dial section reads out assigned data of the selected key from the first memory, and sends the data to a destination apparatus assigned by the selected key. The first memory stores data to be used by the one-touch dial section (one-touch dial data) in the destination apparatus.

In order to enter the one-touch dial data or speed dial data in a different facsimile apparatus, the detecting section searches through the third memory of the destination apparatus to find a vacant memory space for storing the one-touch dial data. In a similar fashion, the detecting section also searches through the fourth memory to find a vacant memory space for storing the speed dial data.

The vacant memory space may be detected, for example, by finding the size of the memory space in bytes, or by finding the number of data that can be entered in the memory (maximum entries). The vacant memory space in the third memory and fourth memory does not necessarily mean a free memory space in which no data is contained, but it includes a memory space containing data that may be overwritten. The first memory and the second memory may be realized by nonvolatile memory, for example.

By the entry section, the stored data in the first memory is entered in the vacant memory space of the third memory, and the stored data in the second memory is entered in the fourth memory.

If the size of stored data in the first memory exceeds the vacant memory space in the third memory for example, some of the one-touch dial data will not be entered in the destination apparatus, generating overflow one-touch dial data. Similarly, if the size of stored data in the second memory exceeds the vacant memory space in the fourth memory, some of the speed dial data will not be entered in the destination apparatus, generating overflow speed dial data.

In order to prevent this, the entry section enters at least some of the stored data of the first memory in the fourth memory when the size of stored data in the first memory exceeds the vacant memory space of the third memory and when the size of stored data in the second memory is smaller than the vacant memory space of the fourth memory.

For example, when some of the stored data in the first memory cannot be entered in the third memory, these data are entered in the vacant memory space of the fourth memory. In this way, overflow one-touch dial data can be reduced or eliminated.

With the foregoing configuration, the entry section may be adapted to operate in the following manner. The entry section first compares the size of stored data in the first memory and the vacant memory space of the third memory, and the data of the first memory is entered in the vacant memory space of the third memory according to the size of the vacant memory space in the third memory. Then, the entry section compares the size of stored data in the second memory and the vacant memory space of the fourth memory, and the data of the second memory is stored in the vacant memory space of the fourth memory according to the size of the vacant memory space in the fourth memory. Finally, the stored data of the first memory that was not entered in the third memory is entered in the fourth memory. In this way, the stored data in the first memory and the second memory can be entered in the third memory and fourth memory by maintaining the integrity of the data as much as possible, thereby improving usability of the facsimile apparatus.

That is, the one-touch dial data that were left out can be entered in the speed dial memory even when the maximum number is entries is different, for example, between the two facsimile apparatuses of different models. Therefore, a user is not required to reenter the overflow one-touch dial data, thereby assisting user's data entry.

The present invention therefore provides a facsimile apparatus that can minimize or eliminate overflow one-touch dial data or overflow speed dial data.

The facsimile apparatus may be adapted so that when the number of one-touch dial data entered in a first facsimile apparatus exceeds the number of maximum entries for the one-touch dial data in a second facsimile apparatus, the one-touch dial data and speed dial data of the first facsimile apparatus are entered in the second facsimile apparatus in such a manner that any overflow one-touch dial data are entered in an available vacant memory space of the speed dial memory of the second facsimile apparatus.

In order to solve the foregoing problems, a facsimile apparatus of the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; and a second memory for storing data used by the speed dial section, wherein the facsimile apparatus further includes: a detecting section for finding a vacant memory space in a third memory and a fourth memory of another facsimile apparatus connected to the facsimile apparatus, the third memory storing data used by a one-touch dial section provided in the another facsimile apparatus, the fourth memory storing data used by a speed dial section provided in the another facsimile apparatus; and an entry section for entering data of the first memory in the third memory, and data of the second memory in the fourth memory, the entry section entering at least some of the data stored in the second memory in the third memory when the detecting section finds that an amount of data stored in the second memory exceeds a vacant memory space in the fourth memory, and that an amount of data stored in the first memory is smaller than a vacant memory space in the third memory.

When a combination of two or three numeric keys is selected for example, the speed dial section of the facsimile apparatus reads out assigned data of the selected numeric keys from the second memory, and sends the data to a destination apparatus assigned by the combination of numeric keys. The second memory stores data to be used by the speed dial section (speed dial data) in the destination apparatus. The function of the speed dial section may be realized by using a designated key and a combination of numeric keys.

When one of the keys independently provided from the numeric keys is selected, the one-touch dial section reads out assigned data of the selected key from the first memory, and sends the data to a destination apparatus assigned by the selected key. The first memory stores data to be used by the one-touch dial section (one-touch dial data) in the destination apparatus.

In order to enter the one-touch dial data or speed dial data in a different facsimile apparatus, the detecting section searches through the third memory of the destination apparatus to find a vacant memory space for storing the one-touch dial data. In a similar fashion, the detecting section also searches through the fourth memory to find a vacant memory space for storing the speed dial data.

The vacant memory space may be detected, for example, by finding the size of the memory space in bytes, or by finding the number of data that can be entered in the memory (maximum entries). The vacant memory space in the third memory and fourth memory does not necessarily mean a free memory space in which no data is contained, but it includes a memory space containing data that may be overwritten. The first memory and the second memory may be realized by nonvolatile memory, for example.

By the entry section, the stored data in the first memory is entered in the vacant memory space of the third memory, and the stored data in the second memory is entered in the fourth memory.

If the size of stored data in the first memory exceeds the vacant memory space in the third memory for example, some of the one-touch dial data will not be entered in the destination apparatus, generating overflow one-touch dial data. Similarly, if the size of stored data in the second memory exceeds the vacant memory space in the fourth memory, some of the speed dial data will not be entered in the destination apparatus, generating overflow speed dial data.

In order to prevent this, the entry section enters at least some of the stored data of the second memory in the third memory when the size of stored data in the second memory exceeds the vacant memory space of the fourth memory and when the size of stored data in the first memory is smaller than the vacant memory space of the third memory.

For example, when some of the stored data in the second memory cannot be entered in the fourth memory, these data are entered in the vacant memory space of the third memory. In this way, overflow one-touch dial data can be reduced or eliminated.

With the foregoing configuration, the entry section may be adapted to operate in the following manner. The entry section first compares the size of stored data in the first memory and the vacant memory space of the third memory, and the data of the first memory is entered in the vacant memory space of the third memory according to the size of the vacant memory space in the third memory. Then, the entry section compares the size of stored data in the second memory and the vacant memory space of the fourth memory, and the data of the second memory is stored in the vacant memory space of the fourth memory according to the size of the vacant memory space in the fourth memory. Finally, the stored data of the first memory that was not entered in the third memory is entered in the fourth memory. In this way, the stored data in the first memory and the second memory can be entered in the third memory and fourth memory by maintaining the integrity of the data as much as possible, thereby improving usability of the facsimile apparatus.

That is, the speed dial data that were left out can be entered in the one-touch dial memory even when the maximum number is entries is different, for example, between the two facsimile apparatuses of different models. Therefore, a user is not required to reenter the overflow speed dial data, thereby assisting user's data entry.

The present invention therefore provides a facsimile apparatus that can minimize or eliminate overflow one-touch dial data or overflow speed dial data.

The facsimile apparatus may be adapted so that when the number of speed dial data entered in the first facsimile apparatus exceeds the number of maximum entries for the speed dial data in the second facsimile apparatus, the one-touch dial data and speed dial data of the first facsimile apparatus are entered in the second facsimile apparatus in such a manner that any overflow speed dial data are entered in an available vacant memory space of the one-touch dial memory of the second facsimile apparatus.

In order to solve the foregoing problems, a facsimile apparatus of the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; a second memory for storing data used by the speed dial section; and an entry section for entering data of the first memory and data of the second memory in a vacant memory space of at least one of (a) a third memory storing data used by a one-touch dial section provided in a different facsimile apparatus connected to the facsimile apparatus and (b) a fourth memory storing data used by a speed dial section provided in the different facsimile apparatus, wherein the data of the first memory and the data of the second memory are first entered in the third memory.

When a combination of two or three numeric keys is selected for example, the speed dial section of the facsimile apparatus reads out assigned data of the selected numeric keys from the second memory, and sends the data to a destination apparatus assigned by the combination of numeric keys. The second memory stores data to be used by the speed dial section (speed dial data) in a destination apparatus. The function of the speed dial section may be realized by using a designated key and a combination of numeric keys.

When one of the keys independently provided from the numeric keys is selected, the one-touch dial section reads out assigned data of the selected key from the first memory, and sends the data to a destination apparatus assigned by the selected key. The first memory stores data to be used by the one-touch dial section (one-touch dial data) in the destination apparatus.

In order to enter the one-touch dial data or speed dial data in a different facsimile apparatus, the one-touch dial data in the first memory and the speed dial data in the second memory are entered in a vacant memory space of at least one of the third memory and fourth memory provided in the different facsimile apparatus, by giving priority to the third memory.

For example, the data of the first memory is entered in the third memory, and the data of the second memory is entered in the third memory. The data of the first memory that could not be entered in the third memory are entered in the fourth memory. The data of the second memory that could not be entered in the third memory are entered in the fourth memory.

In this case, the data of the second memory is first entered in the third memory when the size of stored data in the second memory exceeds the vacant memory space of the fourth memory, thereby enabling at least some of the overflow data to be entered in the third memory. As a result, overflow speed dial data can be reduced or eliminated.

Comparing speed dials and one-touch dials, the one-touch dials can be set up with a single key, as compared with the speed dials that require a combination of two or three keys. Therefore, the one-touch dials are generally more convenient than the speed dials.

Thus, giving priority to the third memory offers a more convenient way of using the facsimile apparatus, because in this case the number of entries for the one-touch dial data can be increased in the destination facsimile apparatus receiving the one-touch dial data.

In order to solve the foregoing problems, a facsimile apparatus of the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; and a second memory for storing data used by the speed dial section, and the facsimile apparatus further includes: a frequency measuring section for measuring and storing, for each destination, frequency by which data stored in the first memory and data stored in the second memory are used; and an entry section for entering the data of the first memory and the data of the second memory, in the order of the highest frequency to the lowest frequency of use as measured by the frequency measuring section, in a vacant memory space of at least one of a third memory and a fourth memory, the third memory and the fourth memory being provided in another facsimile apparatus connected to the facsimile apparatus, and respectively storing data used by a one-touch dial section and a speed dial section provided in the another facsimile apparatus, wherein the data of the first memory and the data of the second memory are first entered in the third memory.

When a combination of two or three numeric keys is selected for example, the speed dial section of the facsimile apparatus reads out assigned data of the selected numeric keys from the second memory, and sends the data to a destination apparatus assigned by the combination of numeric keys. The second memory stores data to be used by the speed dial section (speed dial data) in the destination apparatus. The function of the speed dial section may be realized by using a designated key and a combination of numeric keys.

When one of the keys independently provided from the numeric keys is selected, the one-touch dial section reads out assigned data of the selected key from the first memory, and sends the data to a destination apparatus assigned by the selected key. The first memory stores data to be used by the one-touch dial section (one-touch dial data) in the destination apparatus.

For each destination, the frequency measuring section measures the frequency by which the stored data of the first memory is used by the one-touch dial section. The frequency by which the stored data in the second memory is used by the speed dial section is also measured for each destination by the frequency measuring section. The result of measurement is stored in the first memory or second memory along with the data to be sent to their destinations, for example. The measurement of frequency may be carried out in any manner. For example, the frequency may be updated and increased every time the data is used. Alternatively, the frequency of unused data may be decreased on a regular basis, for example.

In order to enter the one-touch dial data or speed dial data in a different facsimile apparatus, the one-touch dial data in the first memory and the speed dial data in the second memory are entered, in the order of the highest frequency to the lowest frequency as measured by the frequency measuring section, in a vacant memory space of at least one of the third memory and fourth memory provided in the different facsimile apparatus, by giving priority to the third memory.

For example, the data of the first memory is entered in the third memory according to the frequency of use, and the data of the second memory is stored in the third memory according to the frequency of use. The data of the first memory that could not be entered in the third memory are entered in the fourth memory according to the frequency of use. The data of the second memory that could not be entered in the third memory are entered in the fourth memory according to the frequency of use.

In this case, the data of the second memory is first entered in the third memory when the size of stored data in the second memory exceeds the vacant memory space of the fourth memory, thereby enabling at least some of the overflow data to be entered in the third memory. As a result, overflow speed dial data can be reduced or eliminated.

Comparing speed dials and one-touch dials, the one-touch dials can be set up with a single key, as compared with the speed dials that require a combination of two or three keys. Therefore, the one-touch dials are generally more convenient than the speed dials.

Thus, giving priority to the third memory offers a more convenient way of using the facsimile apparatus, because in this case the number of entries for the one-touch dial data can be increased in the destination facsimile apparatus receiving the one-touch dial data.

Further, by entering data according to the frequency of use, it is ensured that frequently used data are entered in the destination facsimile apparatus. This is effective in maintaining usability of the facsimile apparatus. Further, usability can be improved because the order of data entry is determined by the frequency by which data is used in the facsimile apparatus.

By thus entering the stored data of the first memory and second memory in the third memory and fourth memory not by maintaining the state of stored data but by changing the order of data entry based on the frequency of use, usability of the facsimile apparatus can be improved.

In order to solve the foregoing problems, a facsimile apparatus according to the present invention with the foregoing configuration includes: a frequency measuring section for measuring and storing, for each destination, frequency by which data stored in the first memory are used by the one-touch dial section and frequency by which data stored in the second memory are used by the speed dial section, wherein, when the detecting section finds that an amount of data stored in the first memory exceeds a vacant memory space in the third memory, and that an amount of data stored in the second memory is smaller than a vacant memory space in the fourth memory, the entry section enters at least some of the data stored in the first memory in the fourth memory in the order of the highest frequency to the lowest frequency of use as measured by the frequency measuring section.

For each destination, the frequency measuring section measures the frequency by which the stored data of the first memory is used by the one-touch dial section. The frequency by which the stored data in the second memory is used by the speed dial section is also measured for each destination by the frequency measuring section. The result of measurement is stored in the first memory or second memory along with the data to be sent to their destinations, for example. The measurement of frequency may be carried out in any manner. For example, the frequency may be updated and increased every time the data is used. Alternatively, the frequency of unused data may be decreased on a regular basis, for example.

The entry section enters at least some of the stored data in the first memory in the fourth memory in the order of the frequency as measured by the frequency measuring section, when the size of stored data in the first memory exceeds the vacant memory space in the third memory and when the size of stored data in the second memory is smaller than the vacant memory space in the fourth memory.

For example, the stored data of the first memory that cannot be entered in the third memory are entered in the vacant memory space of the fourth memory in the order of the highest frequency to the lowest frequency as measured by the frequency measuring section. In this way, overflow one-touch dial data can be reduced or eliminated. Further, because the data are entered according to their frequency of use, it is ensured that frequently used data are entered in the destination facsimile apparatus. This is effective in maintaining usability of the facsimile apparatus.

In this manner, overflow one-touch dial data are entered in the speed dial memory in the order of the highest frequency to the lowest frequency of use, because it is not always possible to enter all the overflow data when the number of maximum entries is different between the facsimile apparatuses. This assists user's data entry.

The facsimile apparatus may be adapted to enter overflow one-touch dial data in the speed dial memory in the order of the highest frequency to the lowest frequency of use.

In order to solve the foregoing problems, a facsimile apparatus according to the present invention with the foregoing configuration includes: a frequency measuring section for measuring and storing, for each destination, frequency by which data stored in the first memory are used by the one-touch dial section and frequency by which data stored in the second memory are used by the speed dial section, wherein, when the detecting section finds that an amount of data stored in the second memory exceeds a vacant memory space in the fourth memory, and that an amount of data stored in the first memory is smaller than a vacant memory space in the third memory, the entry section enters at least some of the data stored in the second memory in the third memory in the order of the highest frequency to the lowest frequency of use as measured by the frequency measuring section.

For each destination, the frequency measuring section measures the frequency by which the stored data of the first memory is used by the one-touch dial section. The frequency by which the stored data in the second memory is used by the speed dial section is also measured for each destination by the frequency measuring section. The result of measurement is stored in the first memory or second memory along with the data to be sent to their destinations, for example. The measurement of frequency may be carried out in any manner. For example, the frequency may be updated and increased every time the data is used. Alternatively, the frequency of unused data may be decreased on a regular basis, for example.

The entry section enters at least some of the stored data in the second memory in the third memory in the order of the frequency as measured by the frequency measuring section, when the size of stored data in the second memory exceeds the vacant memory space in the fourth memory and when the size of stored data in the first memory is smaller than the vacant memory space in the third memory.

For example, the stored data of the second memory that cannot be entered in the fourth memory are entered in the vacant memory space of the third memory in the order of the highest frequency to the lowest frequency as measured by the frequency measuring section. In this way, overflow speed dial data can be reduced or eliminated. Further, because the data are entered according to their frequency of use, it is ensured that frequently used data are entered in the destination facsimile apparatus. This is effective in maintaining usability of the facsimile apparatus.

In this manner, overflow speed dial data are entered in the one-touch dial memory in the order of the highest frequency to the lowest frequency of use, because it is not always possible to enter all the overflow data when the number of maximum entries is different between the facsimile apparatuses. This assists user's data entry.

The facsimile apparatus may be adapted to enter overflow speed dial data in the speed dial memory in the order of the highest frequency to the lowest frequency of use, when the speed dial data cannot be entered in the one-touch dial memory.

In order to solve the foregoing problems, a facsimile apparatus according to the present invention includes: a speed dial section for calling, when numeric keys are selected, a destination assigned by a combination of the numeric keys; a one-touch dial section for calling, when one of a plurality of keys independently provided from the numeric keys is selected, a destination assigned by the selected key; a first memory for storing data used by the one-touch dial section; and a second memory for storing data used by the speed dial section, and the facsimile apparatus further includes: a detecting section for finding a vacant memory space in a third memory and a fourth memory of another facsimile apparatus connected to the facsimile apparatus, the third memory storing data used by a one-touch dial section provided in the another facsimile apparatus, the fourth memory storing data used by a speed dial section provided in the another facsimile apparatus; a frequency measuring section for measuring and storing, for each destination, frequency by which stored data in the first memory is used by the one-touch dial section and frequency by which stored data in the second memory is used by the speed dial section; and an entry section for entering the data of the first memory in the third memory when the detecting section finds that an amount of data stored in the first memory is smaller than the vacant memory space of the third memory, and entering the data of the second memory, in the order of the highest frequency to the lowest frequency of use as measured by the frequency measuring section, in a vacant memory space in at least one of the third memory and fourth memory, by giving priority to the third memory.

When a combination of two or three numeric keys is selected for example, the speed dial section of the facsimile apparatus reads out assigned data of the selected numeric keys from the second memory, and sends the data to a destination apparatus assigned by the combination of numeric keys. The second memory stores data to be used by the speed dial section in the destination apparatus. The function of the speed dial section may be realized by using a designated key and a combination of numeric keys.

When one of the keys independently provided from the numeric keys is selected, the one-touch dial section reads out assigned data of the selected key from the first memory, and sends the data to a destination apparatus assigned by the selected key. The first memory stores data to be used by the one-touch dial section in the destination apparatus.

In order to enter the one-touch dial data and speed dial data of the facsimile apparatus in a different facsimile apparatus connected to the facsimile apparatus, the detecting section finds a vacant memory space in the third memory for storing the one-touch dial data in the different facsimile apparatus. The detecting section also finds a vacant memory space in the fourth memory for storing the speed dial data in the different facsimile apparatus.

The vacant memory space may be detected, for example, by finding the size of the memory space in bytes, or by finding the number of data that can be entered in the memory (maximum entries). The vacant memory space in the third memory and fourth memory does not necessarily mean a free memory space in which no data is contained, but it includes a memory space containing data that may be overwritten. The first memory and the second memory may be realized by non-volatile memory, for example.

For each destination, the frequency measuring section measures the frequency by which the stored data of the first memory is used by the one-touch dial section. The frequency by which the stored data in the second memory is used by the speed dial section is also measured for each destination by the frequency measuring section. The result of measurement is stored in the first memory or second memory along with the data to be sent to their destinations, for example. The measurement of frequency may be carried out in any manner. For example, the frequency may be updated and increased every time the data is used. Alternatively, the frequency of unused data may be decreased on a regular basis, for example.

The entry section enters the stored data in the first memory in the vacant memory space of the third memory. The data stored, for example, in the second memory is stored in the vacant memory space of the fourth memory.

When the size of stored data in the first memory is smaller than the vacant memory space of the third memory, the entry section first enters at least some of the stored data in the second memory, in the order of the highest frequency to the lowest frequency of use, in the third memory.

For example, the stored data in the first memory is entered in the vacant memory space of the third memory. Then, the data of the second memory is entered in the remaining vacant memory space of the third memory in the order of the highest frequency to the lowest frequency of use. The data of the second memory that were not entered in the third memory are entered in the fourth memory in the order of the highest frequency to the lowest frequency of use, for example.

Comparing speed dials and one-touch dials, the one-touch dials can be set up with a single key, as compared with the speed dials that require a combination of two or three keys. Therefore, the one-touch dials are generally more convenient than the speed dials.

Thus, giving priority to the third memory offers a more convenient way of using the facsimile apparatus, because in this case the number of entries for the one-touch dial data can be increased in the destination facsimile apparatus receiving the one-touch dial data.

Further, by entering data according to the frequency of use, it is ensured that frequently used data are entered in the destination facsimile apparatus. This is effective in maintaining usability of the facsimile apparatus. Further, usability can be improved because the order of data entry is determined by the frequency by which data is used in the facsimile apparatus.

In the described manner, with the data of the first memory entered, the data of the second memory is first entered in the third memory with priority. In this way, overflow speed dial data can be reduced or eliminated.

Further, in order to take advantage of the benefit of one-touch dials over speed dials, frequently used speed dial numbers are reentered as one-touch dial numbers for improved usability. This is different from the foregoing configuration in which the data are reentered when there is overflow speed dial data in data transfer. In the instant configuration, the speed dial data are entered in the one-touch dial memory regardless of the presence or absence of overflow speed dial data.

The facsimile apparatus may be adapted so that when entering the one-touch dial data and speed dial data of the first facsimile apparatus in the second facsimile apparatus and when the one-touch dial memory has a vacant memory space, the speed dial data of the first facsimile apparatus are entered, in the order of the highest frequency to the lowest frequency of use, in the one-touch memory of the second facsimile apparatus.

In order to solve the foregoing problems, a facsimile apparatus according to the present invention with the foregoing configuration includes: a group dial section, provided for multicast transmission to multiple destinations, for entering a plurality of destinations using one of a speed dial number in the speed dial section, a one-touch dial number in the one-touch dial section, and a facsimile number of a target destination, and calling a plurality of destinations assigned by a predetermined key when the predetermined key is selected, wherein the entry section enters the one-touch dial number or the speed dial number of the group dial section in the another facsimile apparatus, by modifying the one-touch dial number or the speed dial number depending on how the data used by the one-touch dial section and the data used by the speed dial section were entered in the another facsimile apparatus.

According to this configuration, the group dial section of the facsimile apparatus assigns a group dial number to a plurality of destinations using a one-touch dial number, a speed dial number, or a facsimile number. When the group dial number is selected, the facsimile apparatus sends a fax to these destinations at once.

In this case, when the one-touch dial data and speed dial data of the facsimile apparatus are entered in the destination facsimile apparatus, the one-touch dial number and speed dial number assigned to the group dial data are changed to the new one-touch dial number and speed dial number in the destination facsimile apparatus. The group dial data so modified are then entered in the destination facsimile apparatus. This enables the group dial data to be used also in the destination facsimile apparatus. In addition, resetting of group dial data will not be required.

Note that, the simultaneous transmission to multiple destinations, in a strict sense, is not just limited to transmission that is carried out instantaneously. Instead, transmission may be carried out sequentially to multiple destinations by selecting one of the destinations. That is, the simultaneous transmission as used herein may be regarded as multicast transmission.

The facsimile apparatus may be adapted so that a first facsimile apparatus enters group dial data containing, for example, one-touch dial data, speed dial data, and/or a numeric dial number in a second facsimile apparatus in such a manner that when the one-touch dial data in the group dial data of the first facsimile apparatus cannot be entered in the one-touch dial memory of the second facsimile apparatus and when the speed dial memory of the second facsimile apparatus has a vacant memory space, the overflow one-touch dial data is entered as speed dial data in the second facsimile apparatus and the group dial data are entered simultaneously by changing its data structure.

The facsimile apparatus may be adapted so that a first facsimile apparatus enters group dial data containing, for example, one-touch dial data, speed dial data, and/or a numeric dial number in a second facsimile apparatus in such a manner that when the speed dial data in the group dial data of the first facsimile apparatus cannot be entered in the speed dial memory of the second facsimile apparatus and when the one-touch dial memory of the second facsimile apparatus has a vacant memory space, the overflow speed dial data is entered as one-touch dial data in the second facsimile apparatus and the group dial data are entered simultaneously by changing its data structure.

In order to solve the foregoing problems, a facsimile apparatus according to the present invention with the foregoing configuration includes a print section for carrying out a print job for the entered data in the third memory and the fourth memory, according to the result of data entry by the entry section.

By thus printing out the result of data entry with the print section, a user can readily confirm whether there was, for example, a change or deletion in the entered data in the destination facsimile apparatus. In addition, operability of the destination facsimile apparatus can be improved.

The facsimile apparatus according to the foregoing configuration may be adapted to carry out a print job for the entered data in the third memory and the fourth memory according to the result of data entry by the entry section, only when data are different between the first memory and the third memory, or between the second memory and the fourth memory. Alternatively, when data are different, a print job may be carried out only for the different data. In this way, changes made to the data are can be confirmed even more easily.

In order to solve the foregoing problems, a facsimile apparatus of the present invention includes: a speed dial section for calling, when a speed dial number assigned by a combination of numeric keys is selected, a destination assigned by the speed dial number; a one-touch dial section for calling, when a one-touch dial number assigned by one of a plurality of keys independently provided from the numeric keys is selected, a destination assigned by the one-touch dial number; and a group dial section, provided for multicast transmission to multiple destinations, for assigning a group dial number to a predetermined key so as to enter a plurality of destinations using one of a speed dial number in the speed dial section, a one-touch dial number in the one-touch dial section, and a facsimile number of a target destination, and calling the plurality of destinations with the group dial number when the group dial number is selected, and the facsimile apparatus further includes an entry section for entering data used by the one-touch dial section and data used by the speed dial section in another facsimile apparatus connected to the facsimile apparatus, wherein the entry section enters the data of the one-touch dial section in a speed dial memory of the another facsimile apparatus according to a memory size of the facsimile apparatus, and enters the one-touch dial number as a speed dial number, or the entry section entering the data of the speed dial section in a one-touch dial memory of the another facsimile apparatus according to a memory size of the facsimile apparatus, and entering the speed dial number as a one-touch dial number, and wherein the entry section enters the data of the group dial section in the another facsimile apparatus, by modifying the data according to the one-touch dial number or the speed dial number entered in the another facsimile apparatus.

The facsimile apparatus enters one-touch dial data and speed dial data in the destination facsimile apparatus.

For example, the one-touch dial data are entered in the speed dial memory of the destination facsimile apparatus according to the memory size of the destination facsimile apparatus. In this case, the destination facsimile apparatus assigned previously by a one-touch dial number is reassigned by a speed dial number. Alternatively, the speed dial data are entered in the one-touch dial memory of the destination facsimile apparatus. In this case, the destination facsimile apparatus assigned previously by a speed dial number is reassigned by a one-touch dial number.

The entry section then modifies the group dial data according to the new one-touch dial number or new speed dial number, and enters the modified group dial data in the destination facsimile apparatus. By thus modifying the group dial data according to the transferred one-touch dial data or speed dial data, the group dial data can also be used in the destination facsimile apparatus. In addition, resetting of the group dial data will not be required.

Note that, the simultaneous transmission to multiple destinations, in a strict sense, is not just limited to transmission that is carried out instantaneously. Instead, transmission may be carried out sequentially to multiple destinations by selecting one of the destinations. That is, the simultaneous transmission as used herein may be regarded as multicast transmission.

In order to solve the foregoing problems, a facsimile apparatus according to the present invention with the foregoing configuration is adapted so that the entry section assigns a facsimile number of a target destination to data of the group dial section that was not entered in the another facsimile apparatus, when at least some of the data used by the one-touch dial section or the speed dial section was not entered in the another facsimile apparatus.

The destination is assigned by the entry section using either one of a one-touch dial number, a speed dial number, and a facsimile number.

For the data of multiple destinations entered in the group dial section using a one-touch dial number or a speed dial number, when, for example, the memory size of the destination facsimile apparatus does not allow these data to be entered using a one-touch dial number or a speed dial number, the overflow data are entered using a facsimile number. In this way, the group dial can also be used in the destination facsimile apparatus.

The facsimile apparatus may be adapted so that a first facsimile apparatus enters group dial data containing, for example, one-touch dial data, speed dial data, and/or a numeric dial number in a second facsimile apparatus in such a manner that when the one-touch dial data in the group dial data of the first facsimile apparatus cannot be entered in the one-touch dial memory of the second facsimile apparatus and when the speed dial memory of the second facsimile apparatus does not have a vacant memory space, the overflow one-touch dial data is entered by changing the data structure of the group dial data using a numeric number in the second facsimile apparatus.

The facsimile apparatus may be adapted so that a first facsimile apparatus enters group dial data containing, for example, one-touch dial data, speed dial data, and/or a numeric dial number in a second facsimile apparatus in such a manner that when the speed dial data in the group dial data of the first facsimile apparatus cannot be entered in the speed dial memory of the second facsimile apparatus and when the one-touch dial memory of the second facsimile apparatus does not have a vacant memory space, the overflow speed dial data is entered by changing the data structure of the group dial data using a numeric number in the second facsimile apparatus.

In order to solve the foregoing problems, a facsimile apparatus according to the present invention with the foregoing structure is adapted so that the entry section does not enter the group dial number in the another facsimile apparatus when a group dial section of the another facsimile apparatus does not have enough memory size to store the data of the group dial section entered in the another facsimile apparatus by being modified with the one-touch dial number and the speed dial number.

That is, a group dial number assigned to group dial data is not entered in the destination facsimile apparatus when the group dial data cannot be entered in the destination facsimile apparatus. In this way, it is ensured that no data is left out in transferring the group dial data.

In order to solve the foregoing problems, a facsimile apparatus according to the present invention with the foregoing configuration is adapted to include a print section for carrying out a print job for the data stored in the group dial section, according to a result of data entry by the entry section.

By thus printing the result of data entry, a user is able to confirm that the group dial data were left out. That is, for example, a group dial number is not entered in the destination facsimile apparatus when the group dial data assigned by the group dial number cannot be entered in the destination facsimile apparatus. The result of data entry that the group dial data was not entered is printed out, enabling the user to confirm that the group dial data were left out.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A facsimile apparatus comprising:
   a speed dial section for calling a destination assigned by a selected combination of numeric keys;
   a one-touch dial section for calling, when one of a plurality of keys independently provided from the numeric keys is selected, a destination assigned by the selected key;
   a first memory for storing data used by the one-touch dial section;
   a second memory for storing data used by the speed dial section;
   a detecting section for finding a vacant memory space in a third memory and a fourth memory of another facsimile apparatus connected to the facsimile apparatus, the third memory storing data used by a one-touch dial section provided in said another facsimile apparatus, the fourth memory storing data used by a speed dial section provided in said another facsimile apparatus; and
   an entry section for entering data of the first memory in the third memory, and data of the second memory in the fourth memory,
   the entry section entering at least some of the data stored in the second memory in the third memory when the detecting section finds that an amount of data stored in the second memory exceeds a vacant memory space in the fourth memory, and that an amount of data stored in the first memory is smaller than a vacant memory space in the third memory.

2. The facsimile apparatus as set forth in claim 1, further comprising:
   a print section for carrying out a print job for the data entered in the third memory and the data entered in the fourth memory, according to a result of data entry by the entry section.

3. The facsimile apparatus as set forth in claim 1, further comprising:
   a group dial section, provided for multicast transmission to multiple destinations, for entering a plurality of destinations using at least one of a speed dial number in the speed dial section, a one-touch dial number in the one-touch dial section, and a facsimile number of a target destination, and calling the plurality of destinations assigned by a predetermined key when the predetermined key is selected,
   wherein the entry section enters the one-touch dial number or the speed dial number of the group dial section in said another facsimile apparatus, by modifying the one-touch dial number or the speed dial number depending on how the data used by the one-touch dial section and the data used by the speed dial section were entered in said another facsimile apparatus.

4. A facsimile apparatus comprising:
   a speed dial section for calling, when numeric keys are selected, a destination assigned by a combination of the numeric keys;
   a one-touch dial section for calling, when one of a plurality of keys independently provided from the numeric keys is selected, a destination assigned by the selected key;
   a first memory for storing data used by the one-touch dial section;
   a second memory for storing data used by the speed dial section;
   a detecting section for finding a vacant memory space in a third memory and a fourth memory of another facsimile apparatus connected to the facsimile apparatus, the third memory storing data used by a one-touch dial section provided in said another facsimile apparatus, the fourth memory storing data used by a speed dial section provided in said another facsimile apparatus; and
   an entry section for entering data of the first memory in the third memory, and data of the second memory in the fourth memory,
   the entry section entering at least some of the data stored in the first memory in the fourth memory when the detecting section finds that an amount of data stored in the first memory exceeds a vacant memory space in the third memory, and that an amount of data stored in the second memory is smaller than a vacant memory space in the fourth memory.

5. The facsimile apparatus as set forth in claim 4, further comprising:
   a frequency measuring section for measuring and storing, for each destination, frequency by which data stored in the first memory and data stored in the second memory are used,
   wherein, when the detecting section finds that an amount of data stored in the first memory exceeds a vacant memory space in the third memory, and that an amount of data stored in the second memory is smaller than a vacant memory space in the fourth memory, the entry section enters at least some of the data stored in the first memory in the fourth memory in the order of the highest frequency to the lowest frequency of use as measured by the frequency measuring section.

6. A facsimile apparatus comprising:
- a speed dial section for calling, when numeric keys are selected, a destination assigned by a combination of the numeric keys;
- a one-touch dial section for calling, when one of a plurality of keys independently provided from the numeric keys is selected, a destination assigned by the selected key;
- a first memory for storing data used by the one-touch dial section;
- a second memory for storing data used by the speed dial section; and
- an entry section for entering data of the first memory before data of the second memory in a vacant memory space of at least one of a third memory and a fourth memory respectively storing data used by a one-touch dial section and a speed dial section provided in another facsimile apparatus connected to said facsimile apparatus, the data of the first memory being entered regardless of whether it is used for the one-touch dial section or the speed dial section of said another facsimile apparatus.

7. The facsimile apparatus as set forth in claim 6, further comprising:
- a group dial section, provided for multicast transmission to multiple destinations, for entering a plurality of destinations using at least one of a speed dial number in the speed dial section, a one-touch dial number in the one-touch dial section, and a facsimile number of a target destination, and calling the plurality of destinations assigned by a predetermined key when the predetermined key is selected,
- wherein the entry section enters the one-touch dial number or the speed dial number of the group dial section in said another facsimile apparatus, by modifying the one-touch dial number or the speed dial number depending on how the data used by the one-touch dial section and the data used by the speed dial section were entered in said another facsimile apparatus.

8. The facsimile apparatus as set forth in claim 6, further comprising:
- a print section for carrying out a print job for the data entered in the third memory and the data entered in the fourth memory, according to a result of data entry by the entry section.

9. A facsimile apparatus comprising:
- a speed dial section for calling, when numeric keys are selected, a destination assigned by a combination of the numeric keys;
- a one-touch dial section for calling, when one of a plurality of keys independently provided from the numeric keys is selected, a destination assigned by the selected key;
- a first memory for storing data used by the one-touch dial section;
- a second memory for storing data used by the speed dial section;
- a frequency measuring section for measuring and storing, for each destination, frequency by which data stored in the first memory and data stored in the second memory are used; and
- an entry section for entering the data of the first memory and the data of the second memory, in the order of the highest frequency to the lowest frequency of use as measured by the frequency measuring section, first in a vacant memory space of a third memory and then a vacant memory space of a fourth memory, the third memory and the fourth memory being provided in another facsimile apparatus connected to said facsimile apparatus, and respectively storing data used by a one-touch dial section and a speed dial section provided in said another facsimile apparatus.

10. The facsimile apparatus as set forth in claim 9, further comprising:
- a group dial section, provided for multicast transmission to multiple destinations, for entering a plurality of destinations using at least one of a speed dial number in the speed dial section, a one-touch dial number in the one-touch dial section, and a facsimile number of a target destination, and calling the plurality of destinations assigned by a predetermined key when the predetermined key is selected,
- wherein the entry section enters the one-touch dial number or the speed dial number of the group dial section in said another facsimile apparatus, by modifying the one-touch dial number or the speed dial number depending on how the data used by the one-touch dial section and the data used by the speed dial section were entered in said another facsimile apparatus.

11. The facsimile apparatus as set forth in claim 9, further comprising:
- a print section for carrying out a print job for the data entered in the third memory and the data entered in the fourth memory, according to a result of data entry by the entry section.

12. The facsimile apparatus as set forth in claim 1, further comprising:
- a frequency measuring section for measuring and storing, for each destination, frequency by which data stored in the first memory and data stored in the second memory are used,
- wherein, when the detecting section finds that an amount of data stored in the second memory exceeds a vacant memory space in the fourth memory, and that an amount of data stored in the first memory is smaller than a vacant memory space in the third memory, the entry section enters at least some of the data stored in the second memory in the third memory in the order of the highest frequency to the lowest frequency of use as measured by the frequency measuring section.

13. A facsimile apparatus comprising:
- a speed dial section for calling, when numeric keys are selected, a destination assigned by a combination of the numeric keys;
- a one-touch dial section for calling, when one of a plurality of keys independently provided from the numeric keys is selected, a destination assigned by the selected key;
- a first memory for storing data used by the one-touch dial section;
- a second memory for storing data used by the speed dial section;
- a detecting section for finding a vacant memory space in a third memory and a fourth memory of another facsimile apparatus connected to said facsimile apparatus, the third memory storing data used by a one-touch dial section provided in said another facsimile apparatus, the fourth memory storing data used by a speed dial section provided in said another facsimile apparatus;
- a frequency measuring section for measuring and storing, for each destination, frequency by which data stored in the first memory and data stored in the second memory are used; and
- an entry section for entering the data of the first memory in the third memory when the detecting section finds that an amount of data stored in the first memory is smaller than the vacant memory space in the third memory, and entering the data of the second memory first in the vacant memory space of the third memory and then in the vacant memory space of the fourth memory in the order of the highest frequency to the lowest frequency of use as measured by the frequency measuring section.

14. A facsimile apparatus comprising:

a speed dial section for calling, when a speed dial number assigned by a combination of numeric keys is selected, a destination assigned by the speed dial number;

a one-touch dial section for calling, when a one-touch dial number assigned by one of a plurality of keys independently provided from the numeric keys is selected, a destination assigned by the one-touch dial number;

a group dial section, provided for multicast transmission to multiple destinations, for assigning a group dial number to a predetermined key so as to enter a plurality of destinations using at least one of a speed dial number in the speed dial section, a one-touch dial number in the one-touch dial section, and a facsimile number of a target destination, and calling the plurality of destinations with the group dial number when the group dial number is selected; and an entry section for entering data used by the one-touch dial section and data used by the speed dial section in another facsimile apparatus connected to said facsimile apparatus, the entry section entering the data of the one-touch dial section in a speed dial memory of said another facsimile apparatus according to a memory size of said facsimile apparatus, and entering the one-touch dial number as a speed dial number, or the entry section entering the data of the speed dial section in a one-touch dial memory of said another facsimile apparatus according to a memory size of said facsimile apparatus, and entering the speed dial number as a one-touch dial number, and the entry section entering the data of the group dial section in said another facsimile apparatus, by modifying the data according to the one-touch dial number or the speed dial number entered in said another facsimile apparatus.

15. The facsimile apparatus as set forth in claim 14, wherein the entry section assigns a facsimile number of a target destination to data of the group dial section that could not be entered in said another facsimile apparatus, when at least some of the data used by the one-touch dial section or the speed dial section could not be entered in said another facsimile apparatus.

16. The facsimile apparatus as set forth in claim 15, further comprising:

a print section for carrying out a print job for the data stored in the group dial section, according to a result of data entry by the entry section.

17. The facsimile apparatus as set forth in claim 14, wherein the entry section does not enter the group dial number in said another facsimile apparatus when a group dial section of said another facsimile apparatus does not have enough memory size to store the data of the group dial section entered in said another facsimile apparatus by being modified with the one-touch dial number and the speed dial number.

18. The facsimile apparatus as set forth in claim 17, further comprising:

a print section for carrying out a print job for the data stored in the group dial section, according to a result of data entry by the entry section.

19. The facsimile apparatus as set forth in claim 14, further comprising:

a print section for carrying out a print job for the data stored in the group dial section, according to a result of data entry by the entry section.

20. A data entry method for entering speed dial data and one-touch dial data of a first facsimile apparatus in a second facsimile apparatus, the first facsimile apparatus and the second facsimile apparatus each including a speed dial section for calling, when numeric keys are selected, a destination assigned by a combination of the numeric keys, and a one-touch dial section for calling, when one of a plurality of keys independently provided from the numeric keys is selected, a destination assigned by the selected key, said method comprising the step of:

entering at least some of the speed dial data stored in the first facsimile apparatus in a memory in the one-touch dial section of the second facsimile apparatus, or entering at least some of the one-touch dial data stored in the first facsimile apparatus in a memory in the speed dial section of the second facsimile apparatus.

* * * * *